US009867163B2

United States Patent
Xu et al.

(10) Patent No.: US 9,867,163 B2
(45) Date of Patent: Jan. 9, 2018

(54) METHODS AND APPARATUS FOR POWER SAVING IN BROADCASTING CARRIER INFORMATION

(71) Applicant: QUALCOMM Incorporated, San Diego, CA (US)

(72) Inventors: Hao Xu, San Diego, CA (US); Tao Luo, San Diego, CA (US); Tingfang Ji, San Diego, CA (US); Wanshi Chen, San Diego, CA (US); Peter Gaal, San Diego, CA (US); Yongbin Wei, San Diego, CA (US); Gavin B. Horn, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 504 days.

(21) Appl. No.: 13/931,346

(22) Filed: Jun. 28, 2013

(65) Prior Publication Data

US 2014/0016488 A1    Jan. 16, 2014

Related U.S. Application Data

(60) Provisional application No. 61/671,029, filed on Jul. 12, 2012.

(51) Int. Cl.
*H04W 72/00* (2009.01)
*H04W 52/02* (2009.01)
(Continued)

(52) U.S. Cl.
CPC ..... *H04W 72/005* (2013.01); *H04W 52/0206* (2013.01); *H04W 48/12* (2013.01); *H04W 48/14* (2013.01); *Y02B 60/50* (2013.01)

(58) Field of Classification Search
CPC ... H04W 72/00; H04W 72/042; H04W 72/04; H04L 5/0053; H04L 5/001; H04L 5/0098
(Continued)

(56) References Cited

U.S. PATENT DOCUMENTS

| 7,113,519 B2 | 9/2006 | Hammel et al. |
| 7,406,051 B2 * | 7/2008 | Khun-Jush ............... H04L 1/20 370/252 |

(Continued)

FOREIGN PATENT DOCUMENTS

WO    WO-2011147355 A1    12/2011

OTHER PUBLICATIONS

Bai et al., "LTE-Advanced Modem Design: Challenges and Perspectives," IEEE Communications Magazine, Feb. 2012, pp. 178-186.

(Continued)

*Primary Examiner* — Jamal Javaid
(74) *Attorney, Agent, or Firm* — Arent Fox LLP

(57) ABSTRACT

The described aspects include methods and apparatus for activating a transmitter to communicate in a wireless network. A small cell can determine to activate the transmitter to serve user equipment (UE) in a wireless network. The small cell can then broadcast a portion of a set of broadcast signals in a radio frame and broadcast a remaining portion of the set of broadcast signals along with the portion of the set of broadcast signals in a subsequent radio frame. By refraining from immediately broadcasting all broadcast signals, the small cell can mitigate interference to other small cells. In addition, a UE can determine whether to generate random access channel (RACH) sequences for proximity determination or uplink timing synchronization based on parameters received in a RACH order. Moreover, a small (Continued)

cell with an active transmitter can decode discovery signals from a device to facilitate handover determination.

39 Claims, 15 Drawing Sheets

(51) Int. Cl.
  *H04W 48/14* (2009.01)
  *H04W 48/12* (2009.01)
(58) Field of Classification Search
  USPC .................... 370/252, 312, 329, 331, 311
  See application file for complete search history.

(56) References Cited

U.S. PATENT DOCUMENTS

| | | | |
|---|---|---|---|
| 7,831,273 B2 | 11/2010 | Suonvieri | |
| 8,275,376 B2* | 9/2012 | Vikberg | H04L 12/2854 370/328 |
| 2002/0041578 A1 | 4/2002 | Kim et al. | |
| 2004/0029586 A1* | 2/2004 | Laroia | H04W 16/12 455/434 |
| 2004/0127219 A1* | 7/2004 | Chen | H04B 7/022 455/438 |
| 2004/0180675 A1 | 9/2004 | Choi et al. | |
| 2008/0045212 A1* | 2/2008 | Kim | H04W 28/18 455/435.1 |
| 2008/0285511 A1* | 11/2008 | Puri | H04L 5/0046 370/329 |
| 2009/0135754 A1 | 5/2009 | Yavuz et al. | |
| 2009/0163216 A1 | 6/2009 | Hoang et al. | |
| 2009/0197599 A1 | 8/2009 | Cho et al. | |
| 2009/0270094 A1 | 10/2009 | Ito et al. | |
| 2010/0273506 A1* | 10/2010 | Stern-Berkowitz | G01S 5/0009 455/456.1 |
| 2011/0038271 A1* | 2/2011 | Shin | H04W 52/146 370/252 |
| 2011/0064057 A1 | 3/2011 | Lim et al. | |
| 2011/0149885 A1 | 6/2011 | Bachu et al. | |
| 2011/0170496 A1* | 7/2011 | Fong | H04L 5/0053 370/329 |
| 2012/0094663 A1 | 4/2012 | Awoniyi et al. | |
| 2012/0115471 A1 | 5/2012 | Awoniyi et al. | |
| 2013/0155936 A1 | 6/2013 | Deng et al. | |

OTHER PUBLICATIONS

International Search Report and Written Opinion—PCT/US2013/048866—ISA/EPO—dated Nov. 19, 2013. 18 pages.
Partial International Search Report—PCT/US2013/048866—ISA/EPO—dated Oct. 2, 2013. 3 pages.

* cited by examiner

METHODS AND APPARATUS FOR POWER SAVING IN BROADCASTING CARRIER INFORMATION

CLAIM OF PRIORITY UNDER 35 U.S.C §119

The present application for patent claims priority to U.S. Provisional Application No. 61/671,029 entitled "METHODS AND APPARATUS FOR POWER SAVING IN BROADCASTING CARRIER INFORMATION" filed Jul. 12, 2012, and assigned to the assignee hereof and hereby expressly incorporated by reference.

BACKGROUND

Field

The present disclosure relates generally to communication systems, and more particularly, to a method and apparatus for power saving and interference reduction in broadcasting signals/channels related to opportunistic eNB operations, thereby providing consistent service in a wireless communication system.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE/LTE-Advanced is a set of enhancements to the Universal Mobile Telecommunications System (UMTS) mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology.

Nodes for providing small coverage cells have been introduced into wireless networks to allow for coverage in desired areas. Such nodes can include a relay, a UE relay, a remote radio head (RRH), a femto node, a pico node, a micro node, a home evolved Node B (HeNB), a home node B (HNB), or similar devices that can establish a wired or wireless backhaul connection to a wireless network and provide service over a wireless radio connection. Thus, the nodes can expand coverage of base stations or provide additional service, and a UE can connect to such small cells to receive such service. Small cells can turn off or otherwise refrain from utilizing a transmitter during certain times to conserve radio resources in the wireless network and avoid interference with other cells. The small cells can monitor for a discovery signal transmitted by one or more UEs, and can activate the transmitter based on detecting such a discovery signal, in one example. In this regard, the small cell can begin transmitting broadcast signals; however, if the small cell broadcasts at full power, this can create interference to neighboring cells, possibly causing radio link failure.

Thus, aspects of this apparatus and method provide for power saving and interference reduction in broadcasting signals/channels related to opportunistic eNB operations, thereby providing consistent service in a wireless communication system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with controlling broadcasting of signals after activating a transmitter in a small cell. For example, some signals, such as reference signals, synchronization signals, or other signals that facilitate detecting the small cell can be broadcast before other signals, such as system information signals. In this regard, a UE can detect the small cell based on the reference/synchronization signals and can report measurements of the small cell for possible handover while the small cell begins to transmit the other signals. In addition, the small cell can ramp up power of the signals (e.g., separately for each signal or group of signals), and/or ramp up power of signals transmitted in given subframes over a period of time. Thus, possible interference caused by the small cell can be managed over the period of time. In addition, in other examples, other interference management techniques can be used for transmitting the broadcast signals.

In one example, a method for activating a transmitter to communicate in a wireless network is provided. The method includes determining to activate a transmitter to serve user equipment (UE) in a wireless network. The method further includes broadcasting a portion of a set of broadcast signals in a radio frame and broadcasting a remaining portion of the set of broadcast signals along with the portion of the set of broadcast signals in a subsequent radio frame.

In another aspect, an apparatus for activating a transmitter to communicate in a wireless network is provided. The apparatus includes a processor configured to determine to activate a transmitter to serve user equipment (UE) in a wireless network. The processor is further configured to broadcast a portion of a set of broadcast signals in a radio frame and broadcast a remaining portion of the set of broadcast signals along with the portion of the set of broadcast signals in a subsequent radio frame.

In another aspect, an apparatus for activating a transmitter to communicate in a wireless network is provided that includes means for determining to activate a transmitter to serve user equipment (UE) in a wireless network. The apparatus also includes means for broadcasting a portion of a set of broadcast signals in a radio frame and broadcasting a remaining portion of the set of broadcast signals along with the portion of the set of broadcast signals in a subsequent radio frame.

In yet another aspect, a computer-readable media activating a transmitter to communicate in a wireless network is provided that includes machine-executable code for causing at least one computer to determine to activate a transmitter to serve user equipment (UE) in a wireless network. The code may be executable for causing the at least one computer to broadcast a remaining portion of the set of broadcast signals along with the portion of the set of broadcast signals in a subsequent radio frame and for causing the at least one computer to broadcast a remaining portion of the set of broadcast signals along with the portion of the set of broadcast signals in a subsequent radio frame.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
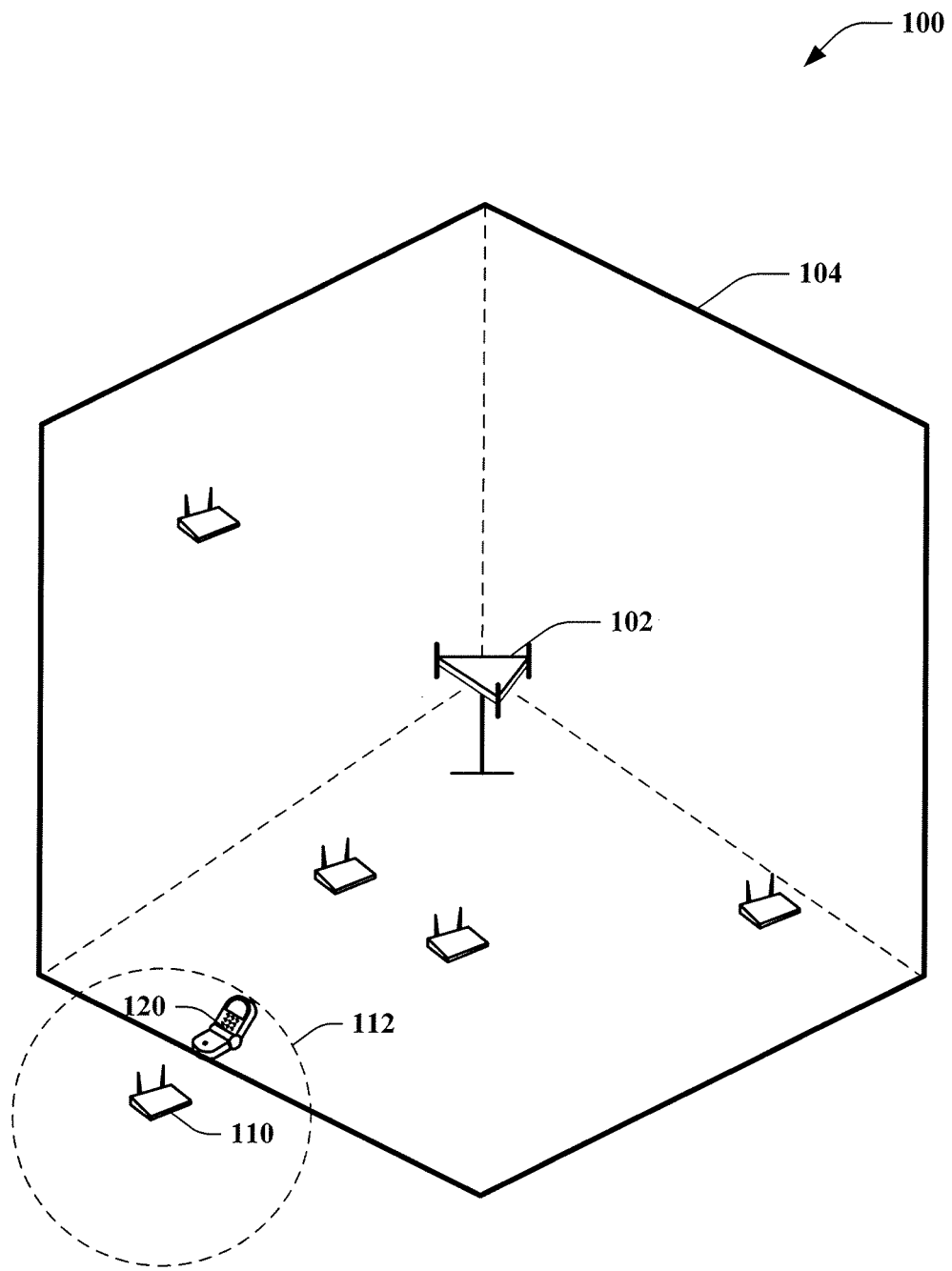
FIG. 1 illustrates an example system for deploying multiple small cells in a macro node coverage area.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described herein are various aspects related to power saving in transmitting signals related to carrier information. For example, a node providing a small cell, referred to herein as a small cell, can determine to broadcast signals in a wireless network. In one example, the small cell can have deactivated a transmitter pending receipt of a discovery signal from a user equipment (UE) or other signal to cause activation of the transmitter and broadcast of the signals. To mitigate interference caused to other cells, the small cell can initially broadcast a portion of a typical set of broadcast channels, and then begin transmitting remaining signals in subsequent time periods. In one example, the small cell can initially transmit reference and/or synchronization signals, such that the UE can discover the small cell and a source node can begin considering the small cell for handover. Subsequently, the small cell can transmit system information signals and/or other signals that include information for establishing communications with the small cell. The small cell can receive configuration information for such functionality from one or more network components, in a handover message from a source node of the UE, and/or the like.

In addition, the small cell can ramp up power of either portion of the broadcast signals or individual signals over time, ramp up power of signals transmitted in a given subframe, or perform other interference cancellation techniques to minimize impact of the broadcasts at other cells. Where power of the signals is ramped up over a period of time, the small cell can modify indication of power for some signals. For example, cell specific reference signal (CRS) power indicated in system information can be indicated for each step in the power ramping. In another example, CRS power can be indicated in system information as a minimum power of the power ramping, an average power, a projection of power as received at the UE, a slope of the power ramping, and/or the like. Moreover, power of other related messages can be modified as well.

Other power savings enhancements related to the carrier information are presented as well. For example, a source node provides the UE with a random access channel (RACH) order for the UE to transmit a RACH preamble to the small cell. The small cell communicates a signal power of the RACH preamble, which is used by the source node to detect the proximity of the UE to the small cell for uplink timing synchronization. In this example, the UE can transmit the RACH preamble based on the RACH order or signal parameters provided in a radio resource control (RRC) message.

A small cell, as referenced herein, can include a relay, a UE relay, a femto node, a pico node, a micro node, a home Node B or a home evolved Node B (H(e)NB), and/or other low power base stations that provide small cellular coverage areas (e.g., as compared to macro nodes), and can be referred to herein using one of these terms, though use of these terms is intended to generally encompass any small cell providing node. For example, a small cell transmits at a relatively low power compared to a macro node associated with a wireless wide area network (WWAN). As such, the coverage area of the small cell can be substantially smaller than the coverage area of a macro base station. Moreover, for example, small cells can be deployed in user homes, offices, other venues, utility polls, public transit, and/or substantially any area to serve a number of devices. For example, a given small cell may use a smaller scale antenna array that may be attached to a housing for the base station or to a common mounting platform.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 illustrates an example wireless communication system 100 for handing over a UE among one or more cells or related nodes. System 100 includes a macro base station 102 that provides a coverage area 104 within which UEs can connect with macro base station 102 using wireless communications to receive wireless network access. Within and outside of coverage area 104, multiple small cells are deployed as well, including small cell 110. The small cells can connect with the wireless network via a backhaul (e.g., an X2 interface, a wireless backhaul, an internet backhaul, etc.), and can provide a coverage cell similar to coverage cell 112 provided by small cell 110 when transmitter is activated and transmitting broadcast signals. A UE 120 is also shown that can be handed over among macro base station 102 and/or small cells within or outside of coverage area 104.

According to an example, UE 120 can communicate with base station 102 to receive wireless network access. The small cells, such as small cell 110, can operate with a transmitter powered off or otherwise can refrain from broadcasting signals in coverage area 104 so as not to interfere with one another and/or other devices communicating in coverage area 104. In this example, UE 120 can transmit a discovery signal or other signal that can be received by one or more nearby small cells. The discovery signal, in one example, can include information regionally unique to the UE to allow recognition thereof. Moreover, base station 102 can command the UE 120 to transmit the discovery signal or otherwise provide resources over which to transmit the discovery signal. Small cell 110, for example, can receive the discovery signal and determine whether to activate its transmitter to facilitate possible handover of UE 120 based on the signal. In one example, small cell 110 can determine a strength of the signal, and can activate a transmitter based on the signal. Thus, UE 120 can detect small cell 110 and report the presence of small cell 110 in a subsequent measurement report to macro base station 102 to facilitate a handover determination.

Macro base station 102 can determine whether to handover UE 120 to small cell 110 based on the measurement report. Macro base station 102 can initiate handover by preparing the small cell 110 and commanding UE 120 to handover thereto. For example, upon activating its transmitter, small cell 110 can begin transmitting a portion of a set of broadcast signals, while waiting to broadcast a remaining portion of the set of broadcast signals. In one example, small cell 110 can broadcast reference and/or synchronization signals (e.g., CRS, primary synchronization signal (PSS), secondary synchronization signal (SSS), etc.) in one or more radio frames. This allows UE 120 to detect small cell 110 and report a signal strength thereof to base station 102. Base station 102 may then evaluate small cell 110 as a potential handover candidate for UE 120.

After a period of time (e.g., tens or hundreds of milliseconds (ms)), small cell 110 can begin transmitting a remaining portion of the set of broadcast signals in a subsequent radio frame. The remaining portion of the set of broadcast signals can include system information signals (e.g., primary broadcast channel (PBCH), system information block (SIB), etc.), along with the initially transmitted portion of the set of broadcast signals. In one example, small cell 110 broadcasts the remaining broadcast signals until a handover message is received from base station 102. In this regard, the system information signals are not transmitted until the UE 120 is ready to establish connection with the small cell 110, thus conserving signaling resources and/or mitigating interference in the wireless network.

In addition, for example, small cell 110 can broadcast the signals using different powers in different subframes to mitigate impact to certain legacy signals. In another example, small cell 110 can broadcast the signals by ramping up power over one or more subframes or radio frames, and can ramp up different signals at different rates. The small cell 110 can also use other interference management techniques in transmitting the signals, such as physical cell identifier (PCI) selection, multicast broadcast over single frequency network (MBSFN) subframe specification, subframe shifting, etc. to mitigate interference of broadcasting the signals. Moreover, parameters related to the above can be configured to the small cell 110 via network configuration and/or received in a handover message. The small cell 110 can indicate power for transmitting certain signals in system information, for example, and the power can be selected based on information regarding power ramping.

Other enhancements are described as well, such as macro base station 102 indicating parameters for communicating a RACH preamble in a RACH order to the UE 120 based on whether the RACH is being used as proximity detection in a discovery signal. Furthermore, small cell 110 can refrain from receiving discovery signals once its transmitter is activated and/or can continue to receive and report measurements of the discovery signals to the macro base station 102 to facilitate handover to small cell 110.

Figure 2:
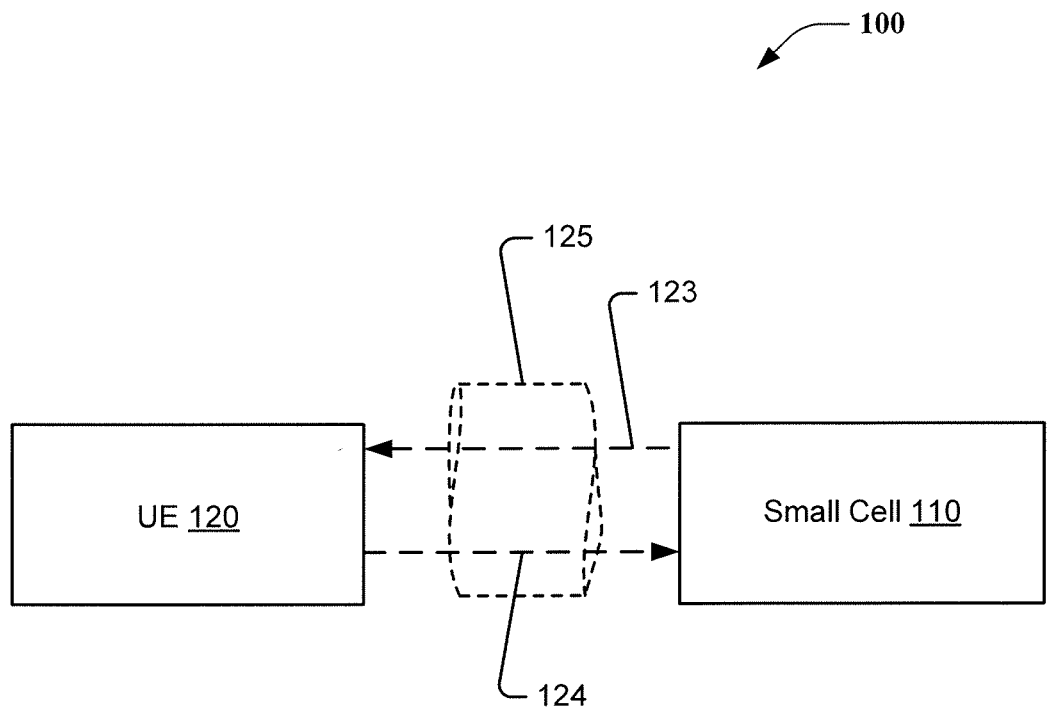
FIG. 2 is a schematic diagram illustrating an example wireless system of aspects of the present disclosure.

Referring to FIG. 2, in another aspect, wireless communication system 100 includes at least one UE 120 that may communicate wirelessly with one or more small cell 110 over one or more wireless link 125. The one or more wireless link 125, may include, but are not limited to, signaling radio bearers and/or data radio bearers. Small cell 110 may be configured to transmit one or more signals 23 to UE 120 over the one or more wireless link 125, and/or UE 120 may transmit one or more signals 124 to small cell 110. In an aspect, signal 123 and signal 124 may include, but are not limited to, one or more messages, such as transmitting a data packet from the UE 120 to small cell 110.

UE 120 may comprise a mobile apparatus and may be referred to as such throughout the present disclosure. Such a mobile apparatus or UE 120 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

Additionally, the one or more small cells, including, but not limited to, small cell 110 of wireless communication system 10, may include one or more of any type of network component, such as an access point, including a node B, a relay, a peer-to-peer device, an authentication, authorization and accounting (AAA) server, a mobile switching center (MSC), a radio network controller (RNC), etc.

Figure 3:
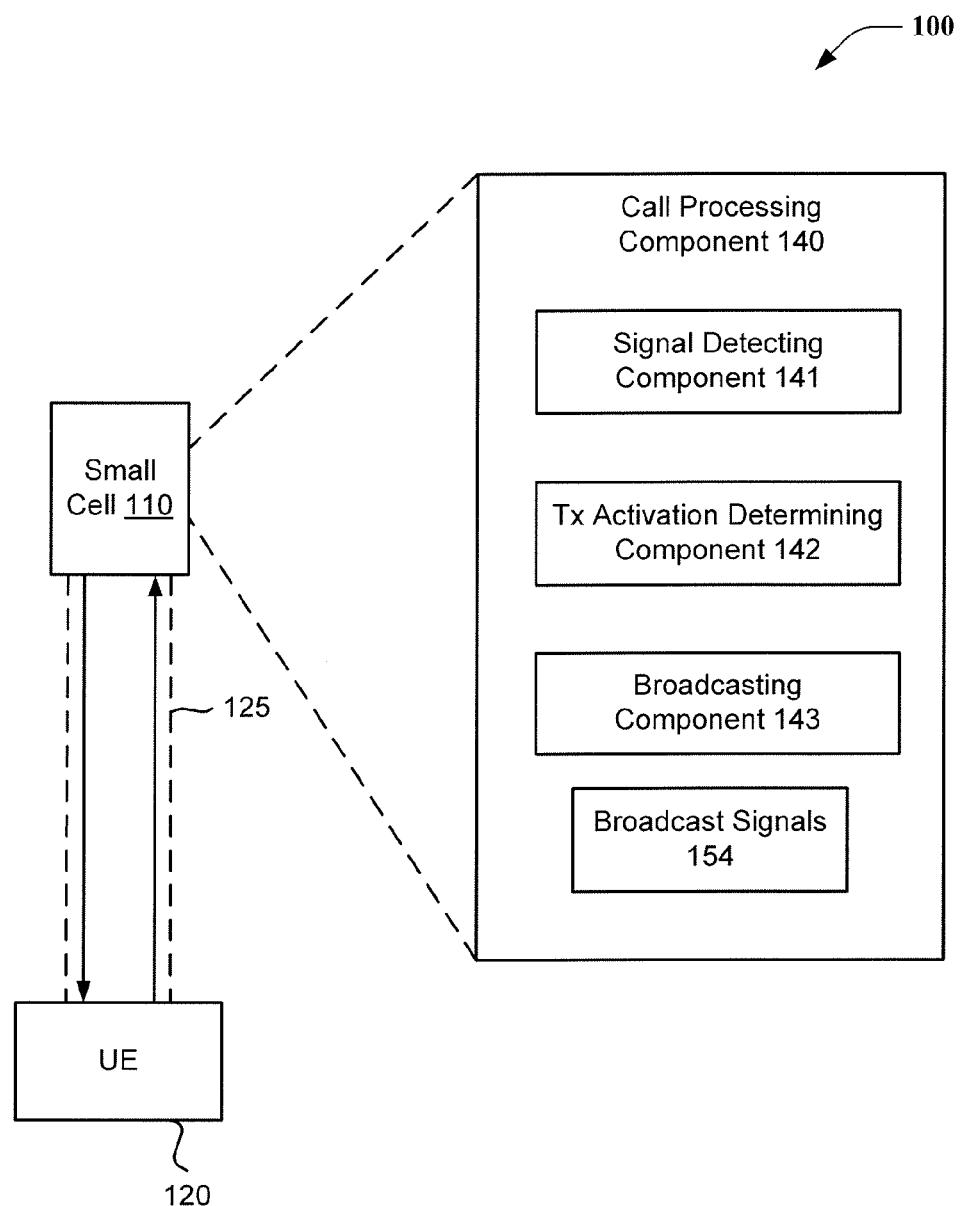
FIG. 3 is a schematic diagram illustrating exemplary aspect of call processing in a wireless communication system.

Referring to FIG. 3, in another aspect of the present apparatus and method, a wireless communication system 100 is configured to include wireless communications between small cell 110 and UE 120. The wireless communications system may be configured to support communications between a number of users. The wireless communication system 100 can be configured for downlink message transmission or uplink message transmission over wireless link 125, as represented by the up/down arrows between small cell 110 and UE 120.

In an aspect, within small cell 110 resides a call processing component 140. The call processing component 140 may be configured, among other things, to include a signal detecting component 141 capable of receiving and detecting signals from UE 120. In other words, the signal detecting component 141 is configured receive and detect signals from UE 120 over wireless link 125.

In another aspect, the call processing component 140 may also be configured to include Tx activation determining component 142 capable of determining to activate a transmitter to serve a UE in a wireless network. In other words, Tx activation determining component 142 is configured to activate a transmitter to serve UE 120 upon receiving and detecting signals from UE 120.

In yet another aspect, the call processing component 140 may also be configured to include broadcasting component 143 capable of broadcasting a portion of a set of broadcast signals in a radio frame. Broadcasting component 143 may also be configured for broadcasting a remaining portion of the set of broadcast signals along with the portion of the set of broadcast signals in a subsequent radio frame. In other words, broadcasting component 143 is configured to broadcast a portion of a set of broadcast signals 154 to UE 120 in a radio frame and broadcast the remaining portion of the set of broadcast signals 154 to UE 120 in a subsequent radio frame over wireless link 125

Figure 4:
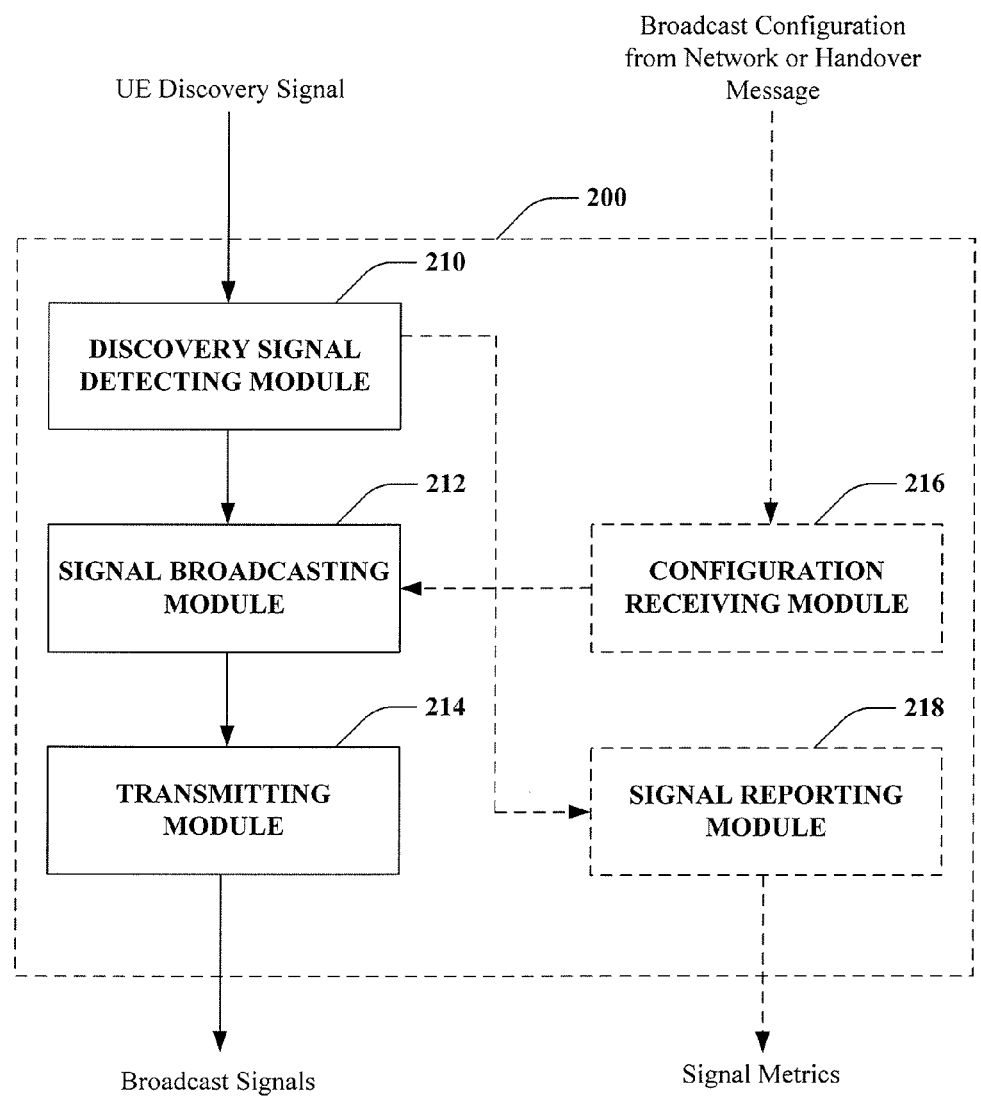
FIG. 4 illustrates an example apparatus for power savings in providing carrier information.

FIG. 4 depicts an example apparatus 200 for broadcasting carrier information in a wireless network. Apparatus 200 can be a small cell that activates a transmitter based on detecting a discovery signal. Apparatus 200 can include a discovery signal detecting module 210 for obtaining discovery signal from a UE, and a signal broadcasting module 212 for transmitting a set of broadcast signals via a transmitting module 214. Apparatus 200 can also optionally include a configuration receiving module 216 for obtaining one or more configuration parameters regarding broadcasting signals, and/or a signal reporting module 218 for communicating metrics of a discovery signal to a source node of the UE.

According to an example, transmitting module 214 can remain inactivate at apparatus 200 for a period of time to conserve radio resources and mitigate interference to surrounding nodes. The apparatus 200 can listen for discovery signals, which can include RACH signals or other defined signals, from UEs for determining whether to power on the transmitting module 214 (e.g., to allow discovery of apparatus 200). Discovery signal detecting module 210 can receive such a signal from a UE, and can determine to activate transmitting module 214. This determination can be based further on comparing a signal quality or strength of the discovery signal to a threshold, in one example. Once the transmitting module 214 is activated, signal broadcasting module 212 can utilize transmitting module 214 to transmit one or more broadcast signals.

For example, signal broadcasting module 212 can transmit a portion of a set of broadcast signals in a first radio frame, while transmitting a remaining portion of the set of broadcast signals, along with the portion, in a subsequent radio frame. Thus, not all broadcast signals need to be initially transmitted, and radio resources are conserved by holding off on transmitting some of the broadcast signals. In one example, signal broadcasting module 212 can initially broadcast reference signals, synchronization signals, or other signals for detecting apparatus 200, while broadcasting other signals, such as system or configuration information signals at a later time.

In one aspect detecting apparatus 200 can mitigate possible interference that would be caused by immediately transmitting all broadcast signals upon activation of transmitting module 214. For example, signal broadcasting module 212 can transmit CRS, PSS, and SSS upon discovery signal detecting module 210 determining to activate transmitting module 214. Thus, the UE can detect the signals for measuring apparatus 200 for a handover determination. Signal broadcasting module 212 can later transmit PBCH and SIB to allow the UE to configure itself to communicate with apparatus 200 (e.g., based on a fixed or configured time delay, based on receiving a handover message from a source node of the UE, and/or the like).

Signal broadcasting module 212 can additionally apply power ramping for transmitting the broadcast signals. In one example, signal broadcasting module 212 can apply different power ramping in different subframes so as not to interfere with legacy carrier transmissions. For instance, a new carrier type can specify transmission of CRS, PSS, and SSS every 5 ms; thus, signal broadcasting module 212 can transmit these signals every fifth subframe, while more slowly ramping up power in other subframes. In one example, signal broadcasting module 212 can only transmit these subframes for a period of time, and then start ramping up the other signals in between the CRS, PSS, SSS subframes. This can avoid immediate interference caused by transmitting all signals at full power when determining to activate transmitting module 214. Thus, neighboring cells can start to detect the signals from transmitting module 214 power ramping, and can compensate accordingly to the interference generated by these signals. Apparatus 200 still transmits CRS and/or PSS/SSS, however, to facilitate detection of apparatus 200.

Ramping up power of the other signals may cause issues for some UEs that report control data to apparatus 200, and in this example, the signal broadcasting module 212 can signal a subset restriction for certain communications to connected UEs. For example, the subset restriction can correspond to radio link management (RLM), radio resource management (RRM), channel state information (CSI), or similar messages from the UEs. The UEs can receive the restriction and refrain from transmitting such messages. Once signal broadcasting module 212 is broadcasting at full power (or at least a sufficient power), signal broadcasting module 212 can signal removal of the restriction to the UEs, allowing UEs to transmit RLM, RRM, CSI, etc., communications.

Additionally, signal broadcasting module 212 can ramp up different signals at different speeds. For example, signal broadcasting module 212 can ramp up system information signals over a longer period of time, or more slowly, than reference or synchronization signals. In one example, where signal broadcasting module 212 transmits master information blocks (MIBs) and SIBs are transmitted, the CRS may have a comparable power, but signal broadcasting module 212 may subsequently increase power faster for CRS transmissions than MIB/SIB transmissions.

Moreover, signal broadcasting module 212 can introduce additional interference cancellation techniques in transmitting the broadcast signals. For example, signal broadcasting module 212 can select a PCI for broadcasting the CRS to avoid CRS collision with a source node of the UE. In another example, signal broadcasting module 212 can specify subframes for transmitting CRS as MBSFN subframes to avoid collision with the source node. Moreover, in an example, signal broadcasting module 212 can shift subframes of the broadcast signals to be offset from those of the source node in a set of subframes. For instance, configuration receiving module 216 can receive the subframes used by the source node for transmitting the broadcast signals, and can use different subframes (e.g., offset by n subframes). Moreover, for example, transmitting module 214 can activate and transmit over one antenna for a period of time before turning on one or more additional antennas to mitigate interference.

In one example, configuration receiving module 216 can receive one or more parameters regarding transmitting the broadcast signals upon activating the transmitting module 214. For example, configuration receiving module 216 can receive the one or more parameters from at least one of a local configuration, a configuration from a network component (e.g. operation, administration, maintenance function (OAM), etc.), a configuration from a source node of the UE (e.g., in a handover message where SIB1 delta is signaled), and/or the like. Thus, the one or more parameters can be received over a wired or wireless backhaul upon registration of the apparatus 200, upon handover of the UE, at some other point in time, etc. The one or more parameters can specify at least one of timing for transmitting portions of the broadcast signals following detecting a discovery signal, power for transmitting the portions of the broadcast signals, power ramping for different signals (e.g., initial power, ramping rate, end power, etc.), power ramping for different subframes, different channel density, carrier type, and/or other parameters related to the described functionality.

Where signal broadcasting module 212 transmits CRS according to ramping power over a period of time, it can signal the transmit power in a SIB. For example, signal broadcasting module 212 can broadcast a new SIB for each step in the power ramping of CRS. In another example, where signal broadcasting module 212 transmits SIB according to a normal transmission schedule (which can be more infrequent than power steps in the power ramping), signal broadcasting module 212 can indicate a minimum or other conservative power in the SIB for the CRS, such as an initial power in the ramping procedure. In another example, signal broadcasting module 212 can indicate at least one of a projected received CRS power in the SIB (e.g., based on when the CRS is transmitted with respect to the SIB), an average power of the CRS during power ramping, a slope of the power ramping, a trend of power ramping at the apparatus 200 or other apparatuses, and/or the like. Thus, a UE can accordingly determine an expected power for the CRS in the SIB that is close to or less than the actual power where the SIB is sent less frequently than CRS power ramping steps.

In addition, because the power level calculation may be off at the UE based on the CRS ramping and indicated power in SIB, a increased range for MSG3 adjustment in a RACH procedure can be used to indicate to the UE a power for transmitting MSG3. For example, MSG3 in LTE currently has a 6 decibel (dB) adjustment range. In one implementation, this can be indicated by 2 bits, where 01=2 dB, 10=4 dB, and 11=6 dB. The possible values can be scaled in this example to a higher range (e.g., 15 dB, where 01=5 dB, 10=10 dB, and 11=15 dB) where needed to convey a larger difference. Such modifications of the available values can be communicated in a configuration received by configuration receiving module 216 and similarly to a UE for determining power adjustment based on received indications.

Where transmitting module 214 is active, discovery signal detecting module 210 can refrain from detecting discovery signals, as UEs can discover and be handed over to apparatus 200. In another example, however, discovery signal detecting module 210 can continue to detect such signals, and signal reporting module 218 can report related signal metrics to the source node, such as a signal strength or signal quality, over a wired or wireless backhaul. In this example, the source node can determine whether to handover the UE to apparatus 200 based on at least one of the metrics and/or based on loading of the apparatus 200 (which can also be indicated by signal reporting module 218), based on traffic type or buffer status of the UE, based on a backhaul condition of the apparatus 200, and/or the like.

Figure 5:
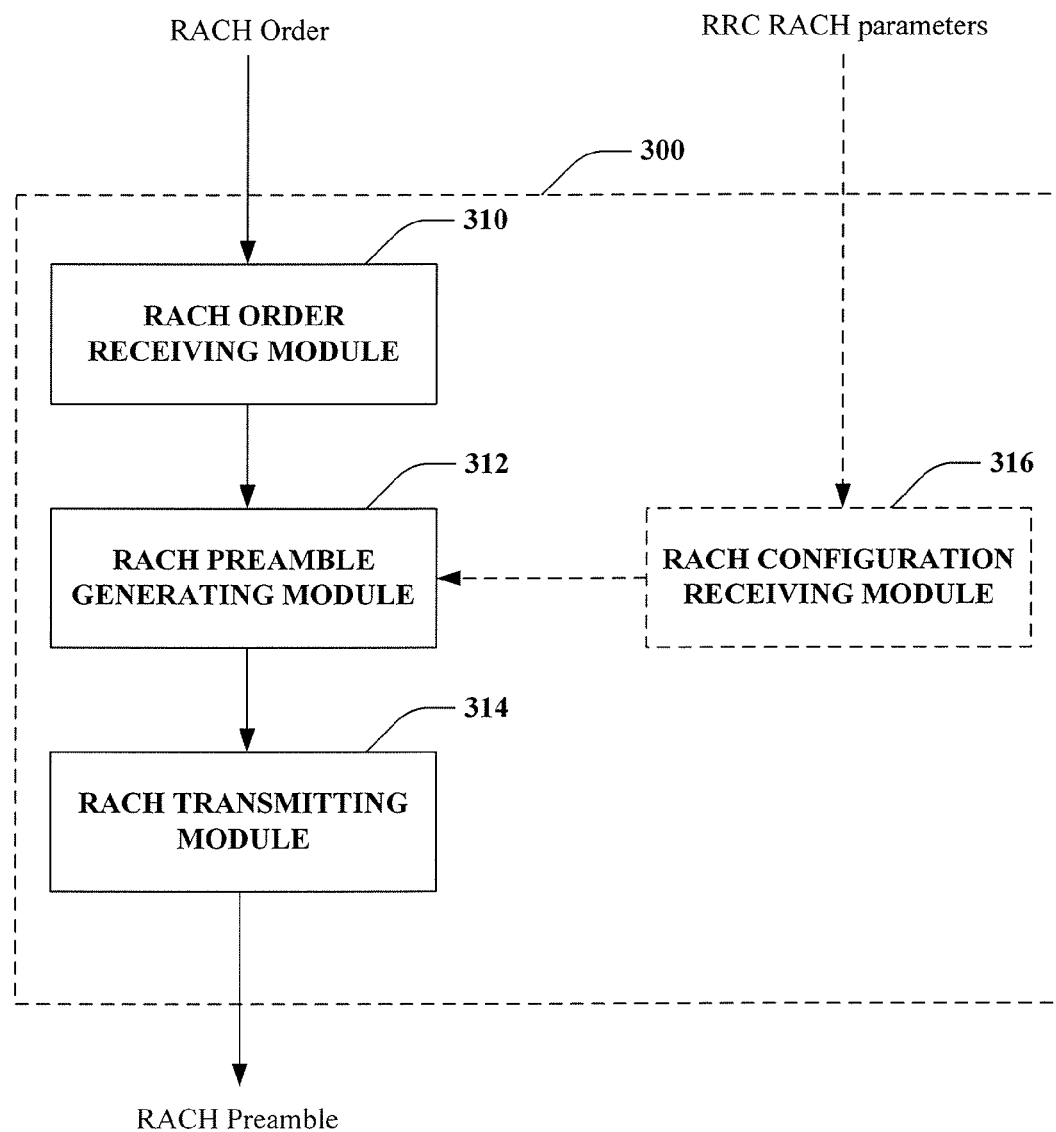
FIG. 5 illustrates an example apparatus for generating a random access channel (RACH) preamble.

FIG. 5 shows an apparatus 300 for differentiating between RACH orders received from a source node. Apparatus 300 can be a UE, for example, that can receive a RACH order from the source node for proximity detection and/or a RACH order for uplink time synchronization. Apparatus 300 can distinguish the RACH orders such to accordingly modify transmission of the associated RACH preamble. Apparatus 300 includes a RACH order receiving module 310 for obtaining a RACH order from a source node, a RACH preamble generating module 312 for determining a RACH preamble to transmit to a small cell, and a RACH transmitting module 314 for transmitting the RACH preamble. Apparatus 300 can optionally include a RACH configuration receiving module 316 for determining one or more parameters for determining the RACH preamble.

According to an example, apparatus 300 can be communicating with a source node to receive wireless network access, and RACH order receiving module 310 can receive a RACH order from the source node over a physical data control channel (PDCCH). RACH preamble generating module 312 can determine one or more parameters for generating a RACH preamble based in part on the RACH order. In one example, the RACH order can be received over a PDCCH, which can indicate the type of RACH order. In another example, the RACH order can include the one or more parameters (e.g., using reserved bits indicated in the order). In yet another example, the RACH order can include an indication of whether received RRC parameters are to be used in generating the RACH preamble. In this example, RACH configuration receiving module 316 can have previously received the one or more parameters in an RRC message from the source node or other network component related to proximity detection RACH. Thus, where the RACH order does not indicate to use received RRC parameters or does not include parameters in reserved bits, RACH preamble generating module 312 can generate a RACH preamble according to uplink timing synchronization.

In any case, where parameters are received and utilized, the one or more parameters can include a RACH configuration, a RACH sequence, an initial RACH transmit power, an initial RACH timing offset, and/or the like. For example, the timings can be set by the source node to avoid collision of the apparatus 300 with other UEs transmitting RACH preambles. RACH preamble generating module 312 in this case can generate a RACH preamble based on the parameters. RACH transmitting module 314 can accordingly transmit the appropriate RACH preamble based on the received parameters for proximity detection or other parameters for uplink timing synchronization.

Moreover, for example, where RACH preamble generating module 312 determines to use one or more parameters related to proximity detection RACH preambles, RACH transmitting module 314 need not prepare to receive MSG2 or transmit MSG3 of the RACH procedure because the purpose of the RACH procedure is to send a signal to the small cell to facilitate proximity detection of apparatus 300.

Figure 6:
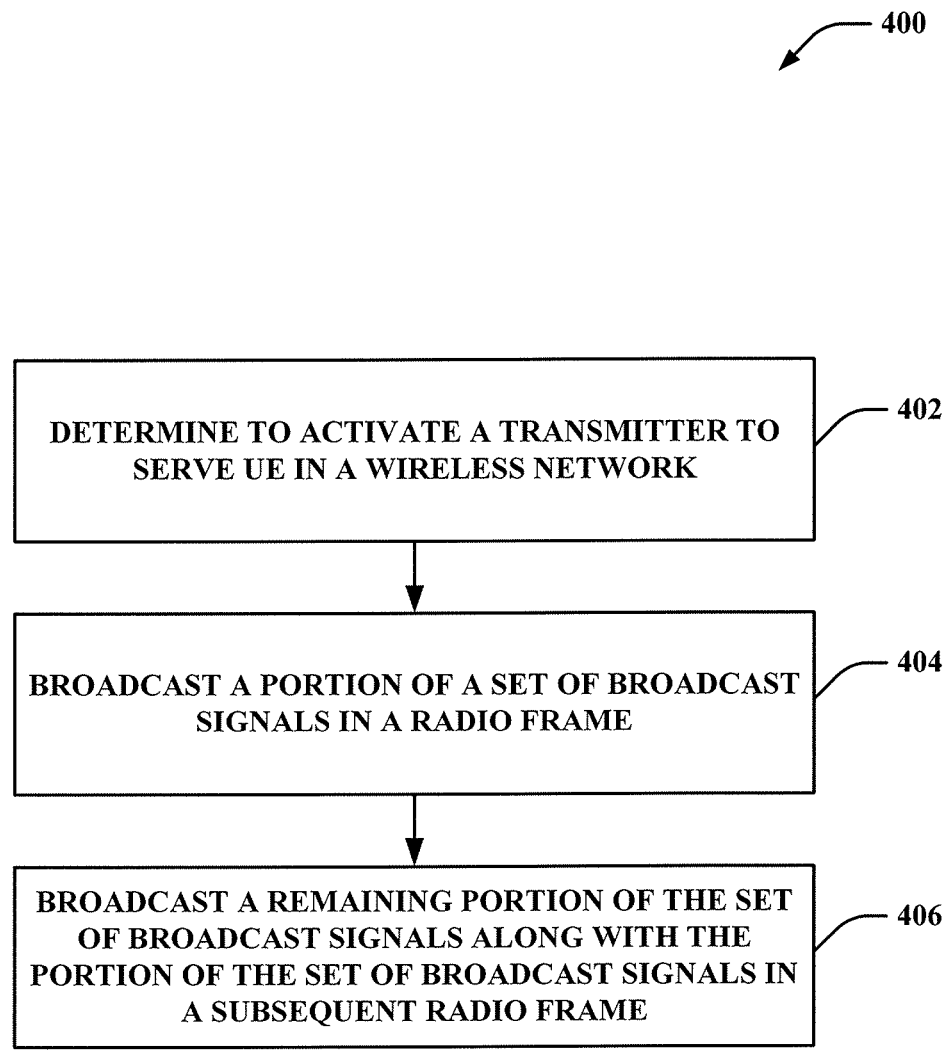
FIG. 6 illustrates an example methodology for broadcasting sets of broadcast signals following activation of a transmitter.
Figure 7:
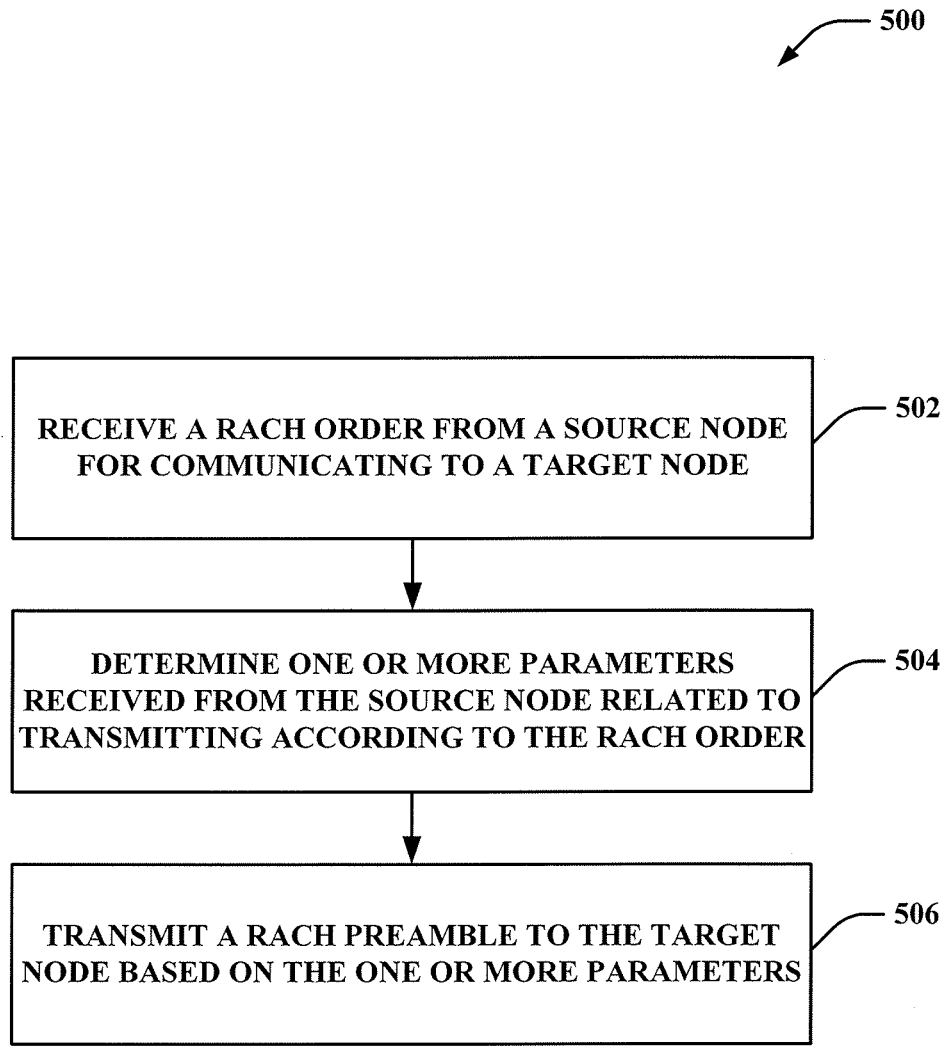
FIG. 7 illustrates an example methodology for generating a RACH preamble.
Figure 8:
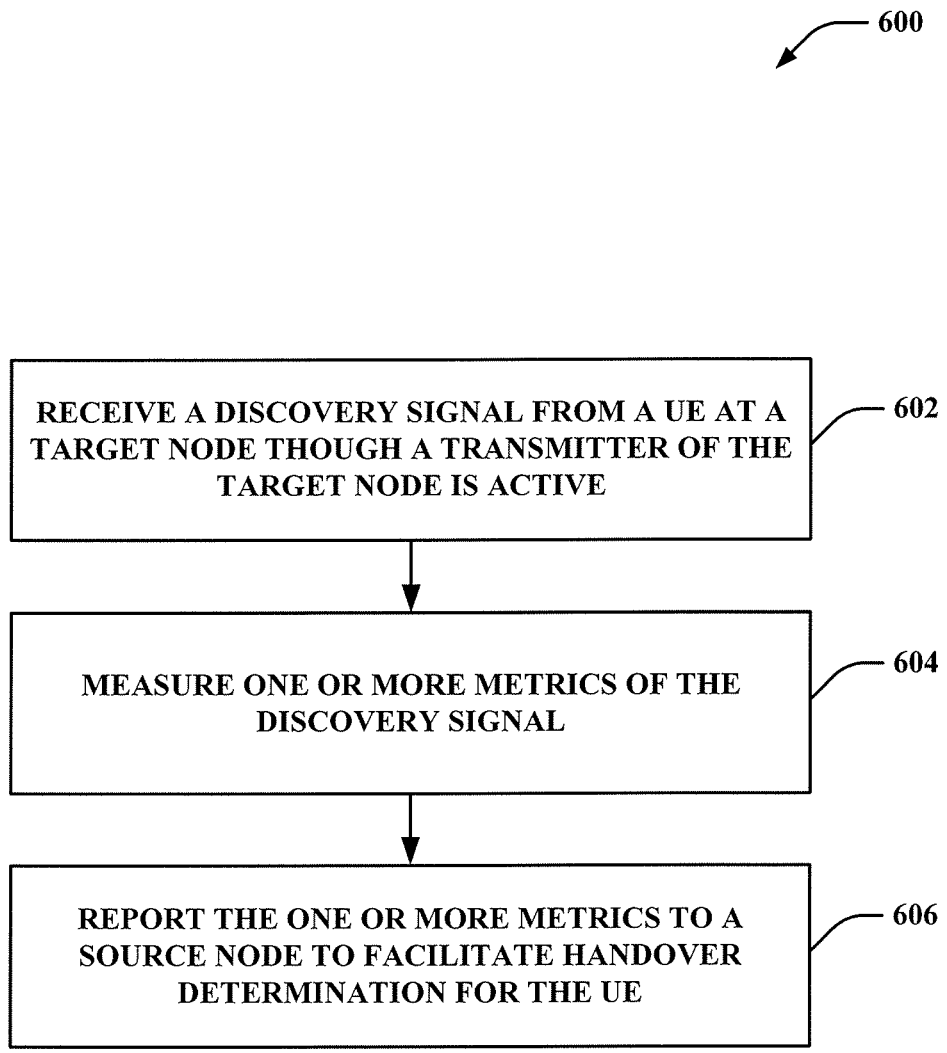
FIG. 8 illustrates an example methodology for receiving discovery signals from one or more UEs.

FIGS. 6-8 illustrate example methodologies for power saving related to broadcasting carrier information. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

FIG. 6 illustrates an example methodology 400 for transmitting a set of broadcast signals based on activating a transmitter. In one embodiment, the methodology 400 may be performed by a small cell 110, apparatus 200, etc., described above.

At 402, it can be determined to activate a transmitter to serve UE in a wireless network. This can include providing power to the transmitter to transmit one or more broadcast signals. The transmitter can be activated in response to receiving and processing a discovery signal or other signals from one or more UEs.

At 404, a portion of a set of broadcast signals can be broadcasted in a radio frame. The portion can include reference signals (e.g., CRS), synchronization signals (e.g., PSS, SSS, etc.), or substantially any signals that facilitate identifying the transmitter of the signals. A remaining portion of the broadcast signals, such as system information signals (e.g., PBCH, MIB/SIB, etc.) need not be transmitted in the radio frame as it can take time, once the transmitter is identified by a UE, to attempt connection establishment in handover.

At 406, the remaining portion of the set of broadcast signals can be broadcast, along with the portion of the set of broadcast signals, in a subsequent radio frame. The subsequent radio frame can be tens of ms, hundreds of ms, etc., later than the radio frame. In one example, the subsequent radio frame can be determined based on receiving a handover message from a source node in, or near in time, to the subsequent radio frame (e.g. broadcasting the remaining portion can be in response to the handover message). This can conserve resources and mitigate interference that may otherwise be caused by transmitting all broadcast signals immediately upon activating the transmitter.

In addition, a power for transmitting the signals can be ramped up in given subframes, ramped up for individual signals, and/or the like. Additional interference cancellation techniques can be performed for the signals, such as PCI selection, MBSFN subframe specification, subframe shifting, etc. Additionally, configuration parameters for timing, power, etc. can be received from a network component or in a handover message. Furthermore, a power of signals, such as CRS, can be specified in other broadcast signals, such as SIB. A minimum, average, slope, trend, etc. can be provided in the SIB, and/or the SIB can be transmitted with each CRS in the case of ramping up power.

FIG. 7 illustrates an example methodology 500 for generating RACH preambles based on whether one or more parameters are signaled. In one embodiment, the methodology 500 may be performed by a UE 120, apparatus 300, etc., described above.

At 502, a RACH order can be received from a source node for communicating to a target node. The RACH order can include one or more parameters related to generating a RACH preamble and/or an indication to use one or more previously received parameters to generate the RACH.

At 504, one or more parameters received from the source node related to transmitting according to the RACH order can be determined. For example, the one or more parameters can be indicated by one or more reserved bits of the RACH order. In another example, the one or more parameters can be previously received over RRC. In this example, the RACH order can indicate whether to use the one or more parameters in generating a RACH preamble. The one or more parameters can relate to a RACH configuration, a RACH sequence, an initial RACH transmit power, an initial RACH timing offset, and/or the like, and can relate to generating a RACH preamble related to proximity detection. If no parameters are indicated, a RACH preamble related to uplink timing synchronization can be generated.

At 506, a RACH preamble can be transmitted to the target node based on the one or more parameters. Thus, the RACH preamble for proximity detection or the RACH preamble for uplink timing synchronization can be transmitted to the target node.

FIG. 8 depicts an example methodology 600 for reporting discovery signal metrics to a source node. In one embodiment, the methodology 600 may be performed by a small cell 110, apparatus 200, etc., described above.

At 602, a discovery signal can be received from a UE at a target node though a transmitter of the target node is active. The discovery signals is transmitted to the target node to facilitate activating the transmitter at the target node to consider the target node as a handover candidate.

At 604, one or more metrics of the discovery signal can be measured. Such metrics can include a signal quality or strength of the signal.

At 606, the one or more metrics can be reported to a source node to facilitate handover determination for the UE. Thus, though the transmitter is active, a small cell, for example, can receive and process the discovery signals to facilitate handover determination at source nodes.

Figure 9:
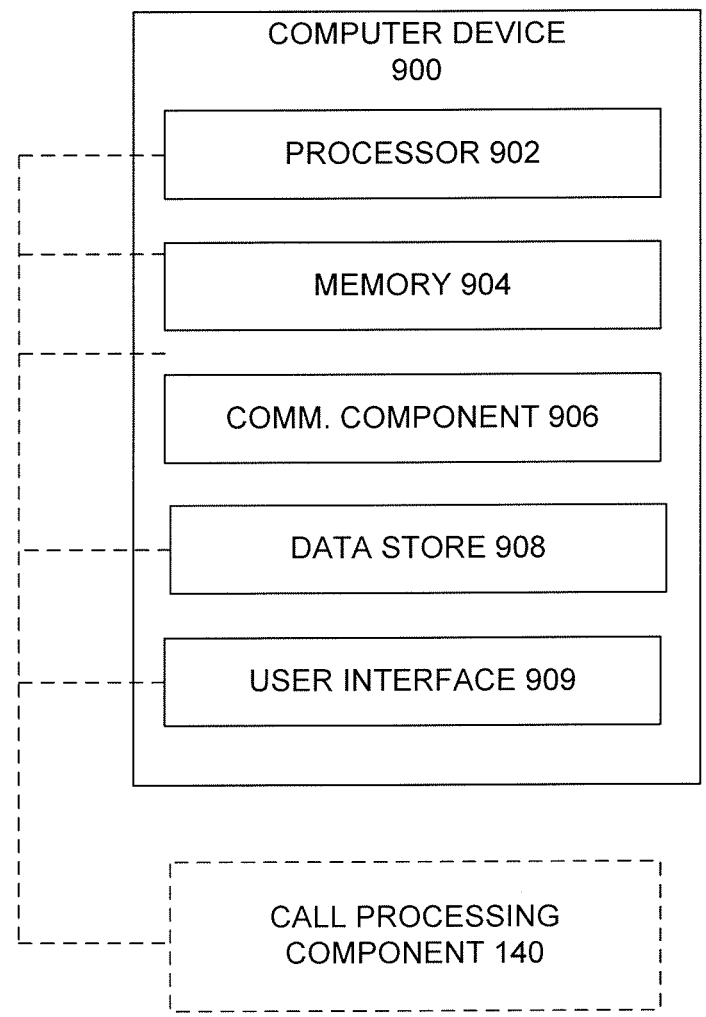
FIG. 9 is a block diagram illustrating additional example components of an aspect of a computer device having a call processing component according to the present disclosure.

Referring to FIG. 9, in one aspect, small cell 110 of FIGS. 1-3 may be represented by a specially programmed or configured computer device 900, wherein the special programming or configuration includes call processing component 140, as described herein. For example, computer device 900 may include one or more components for broadcasting broadcast signals 153 from small cell 110 to UE 120 to network 12, such as in specially programmed computer readable instructions or code, firmware, hardware, or some combination thereof. Computer device 900 includes a processor 902 for carrying out processing functions associated with one or more of components and functions described herein. Processor 902 can include a single or multiple set of processors or multi-core processors. Moreover, processor 902 can be implemented as an integrated processing system and/or a distributed processing system.

Computer device 900 further includes a memory 904, such as for storing data used herein and/or local versions of applications being executed by processor 902. Memory 904 can include any type of memory usable by a computer, such as random access memory (RAM), read only memory (ROM), tapes, magnetic discs, optical discs, volatile memory, non-volatile memory, and any combination thereof.

Further, computer device 900 includes a communications component 906 that provides for establishing and maintaining communications with one or more parties utilizing hardware, software, and services as described herein. Communications component 906 may carry communications between components on computer device 900, as well as between computer device 900 and external devices, such as devices located across a communications network and/or devices serially or locally connected to computer device 900. For example, communications component 906 may include one or more buses, and may further include transmit chain components and receive chain components associated with a transmitter and receiver, respectively, or a transceiver, operable for interfacing with external devices. For example, in an aspect, a receiver of communications component 906 operates to receive one or more data frames 52 via a wireless serving node 16, which may be a part of memory 904.

Additionally, computer device 900 may further include a data store 908, which can be any suitable combination of hardware and/or software, that provides for mass storage of information, databases, and programs employed in connection with aspects described herein. For example, data store 908 may be a data repository for applications not currently being executed by processor 902.

Computer device 900 may additionally include a user interface component 909 operable to receive inputs from a user of computer device 900, and further operable to generate outputs for presentation to the user. User interface component 909 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 909 may include one or more output devices, including but not limited to a display, a speaker, a haptic feedback mechanism, a printer, any other mechanism capable of presenting an output to a user, or any combination thereof.

Furthermore, computer device 900 may include, or may be in communication with, call processing component 140, which may be configured to perform the functions described herein.

Figure 10:
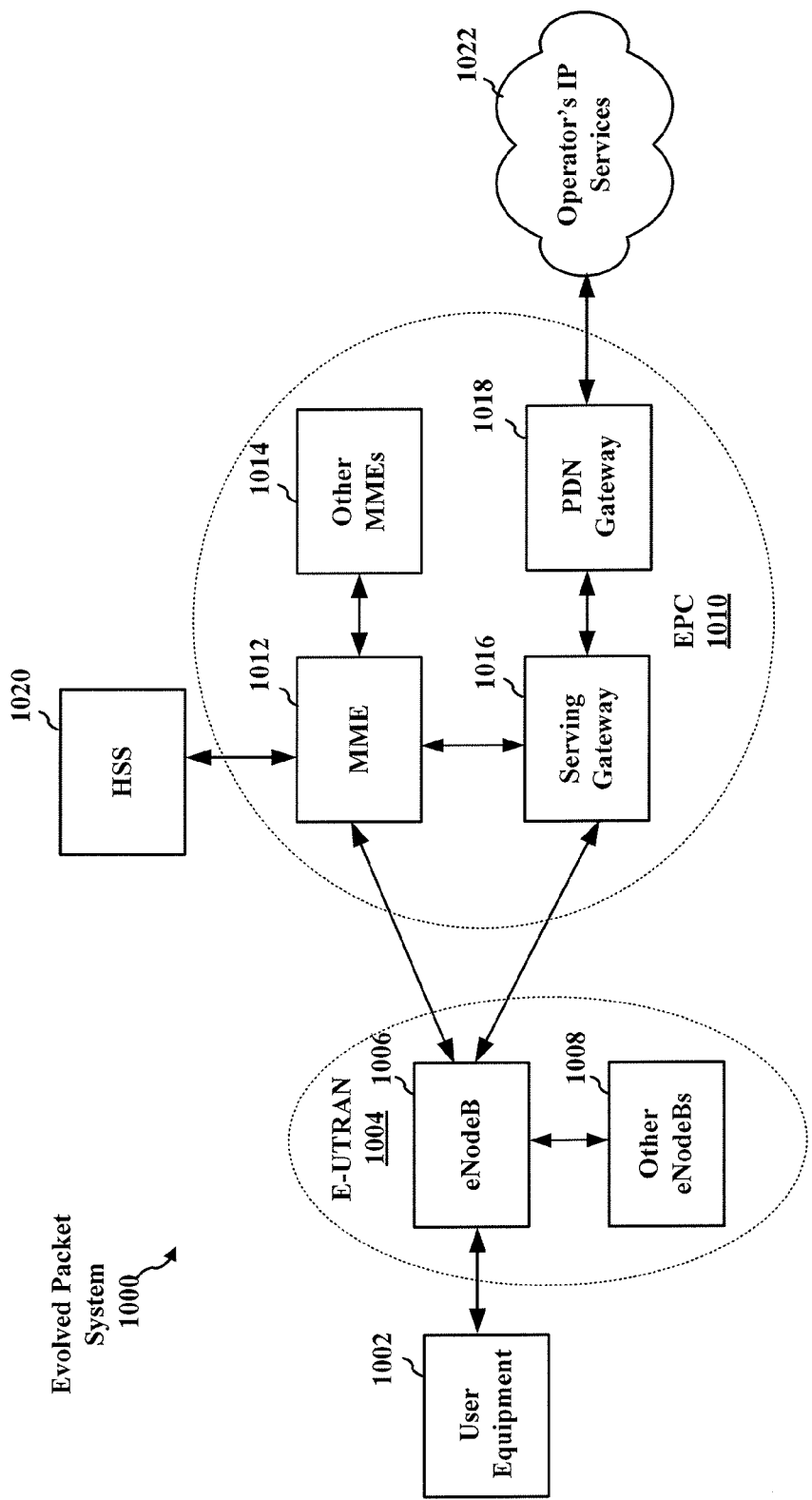
FIG. 10 is a diagram illustrating an example of a network architecture.

FIG. 10 is a diagram illustrating an LTE network architecture 1000. The LTE network architecture 1000 may be referred to as an Evolved Packet System (EPS) 1000. The EPS 1000 may include one or more user equipment (UE) 1002, an Evolved UMTS Terrestrial Radio Access Network (E-UTRAN) 1004, an Evolved Packet Core (EPC) 1010, a Home Subscriber Server (HSS) 1020, and an Operator's IP Services 1022. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 1006 and other eNBs 1008. The eNB 1006 provides user and control planes protocol terminations toward the UE 1002. The eNB 1006 may be connected to the other eNBs 1008 via an X2 interface (e.g., backhaul). The eNB 1006 may also be referred to as a base station, a base transceiver station, a radio base station, a radio transceiver, a transceiver function, a basic service set (BSS), an extended service set (ESS), or some other suitable terminology. The eNB 1006 provides an access point to the EPC 1010 for a UE 1002. Examples of UEs 1002 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 1002 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 1006 is connected by an S1 interface to the EPC 1010. The EPC 1010 includes a Mobility Management Entity (MME) 1012, other MMEs 1014, a Serving Gateway 1016, and a Packet Data Network (PDN) Gateway 1018. The MME 1012 is the control node that processes the signaling between the UE 1002 and the EPC 1010. Generally, the MME 1012 provides bearer and connection management. All user IP packets are transferred through the Serving Gateway 1016, which itself is connected to the PDN Gateway 1018. The PDN Gateway 1018 provides UE IP address allocation as well as other functions. The PDN Gateway 1018 is connected to the Operator's IP Services 1022. The Operator's IP Services 1022 may include the Internet, the Intranet, an IP Multimedia Subsystem (IMS), and a PS Streaming Service (PSS).

Figure 11:
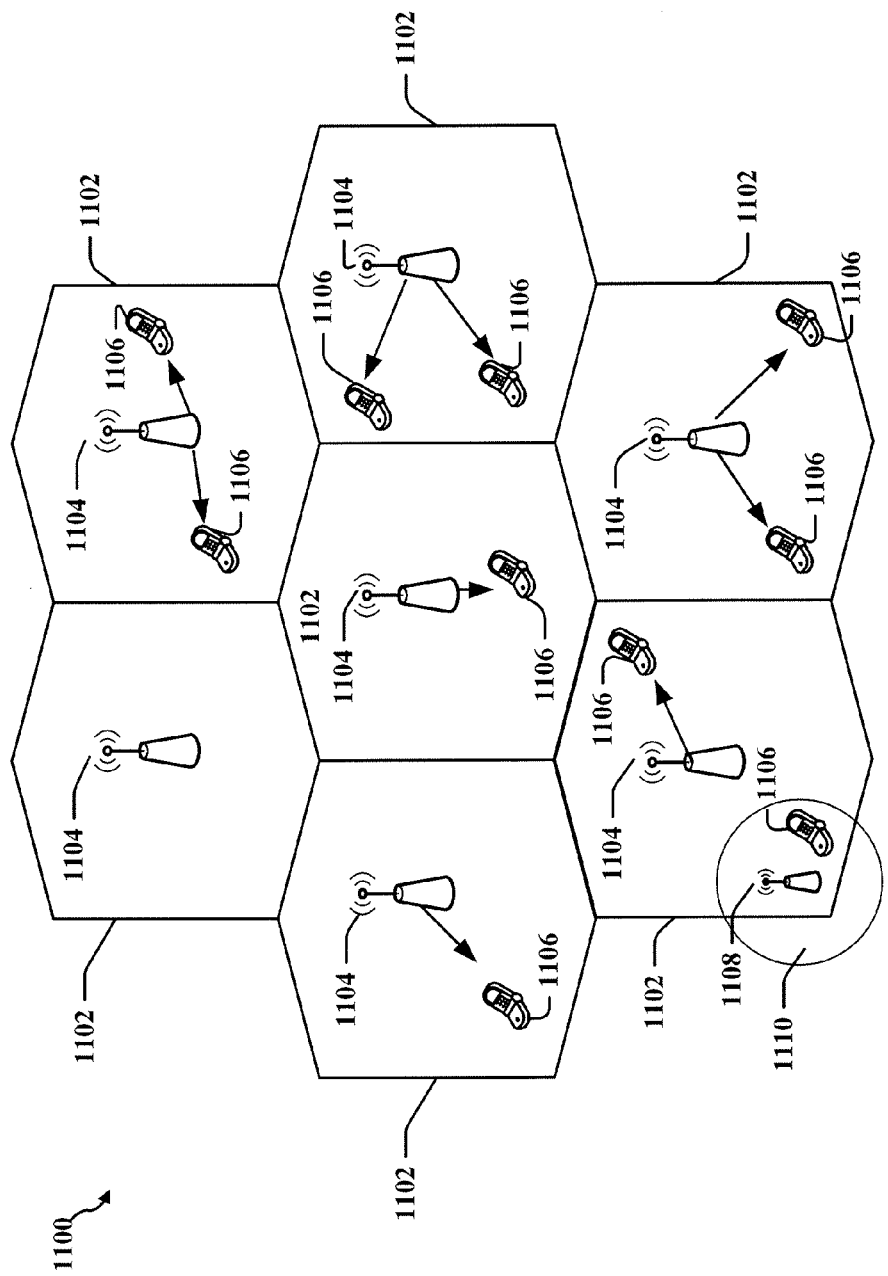
FIG. 11 is a diagram illustrating an example of an access network.

FIG. 11 is a diagram illustrating an example of an access network 1100 in an LTE network architecture. In this example, the access network 1100 is divided into a number of cellular regions (cells) 1102. One or more lower power class eNBs 1108 may have cellular regions 1110 that overlap with one or more of the cells 1102. A lower power class eNB 1108 may be referred to as a remote radio head (RRH). The lower power class eNB 1108 may be a femto cell (e.g., home eNB (HeNB)), pico cell, or micro cell). The macro eNBs 1104 are each assigned to a respective cell 1102 and are configured to provide an access point to the EPC 1010 for all the UEs 1106 in the cells 1102. There is no centralized controller in this example of an access network 1100, but a centralized controller may be used in alternative configurations. The eNBs 1104 are responsible for all radio related functions including radio bearer control, admission control, mobility control, scheduling, security, and connectivity to the serving gateway 1016.

The modulation and multiple access scheme employed by the access network 1100 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (Wi-MAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 1104 may have multiple antennas supporting MIMO technology. The use of MIMO technology enables the eNBs 1104 to exploit the spatial domain to support spatial multiplexing, beamforming, and transmit diversity. Spatial multiplexing may be used to transmit different streams of data simultaneously on the same frequency. The data steams may be transmitted to a single UE 1106 to increase the data rate or to multiple UEs 1106 to increase the overall system capacity. This is achieved by spatially precoding each data stream (e.g., applying a scaling of an amplitude and a phase) and then transmitting each spatially precoded stream through multiple transmit antennas on the DL. The spatially precoded data streams arrive at the UE(s) 1106 with different spatial signatures, which enables each of the UE(s) 1106 to recover the one or more data streams destined for that UE 1106. On the UL, each UE 1106 transmits a spatially precoded data stream, which enables the eNB 1104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the foam of a DFT-spread OFDM signal to compensate for high peak-to-average power ratio (PAPR).

Figure 12:
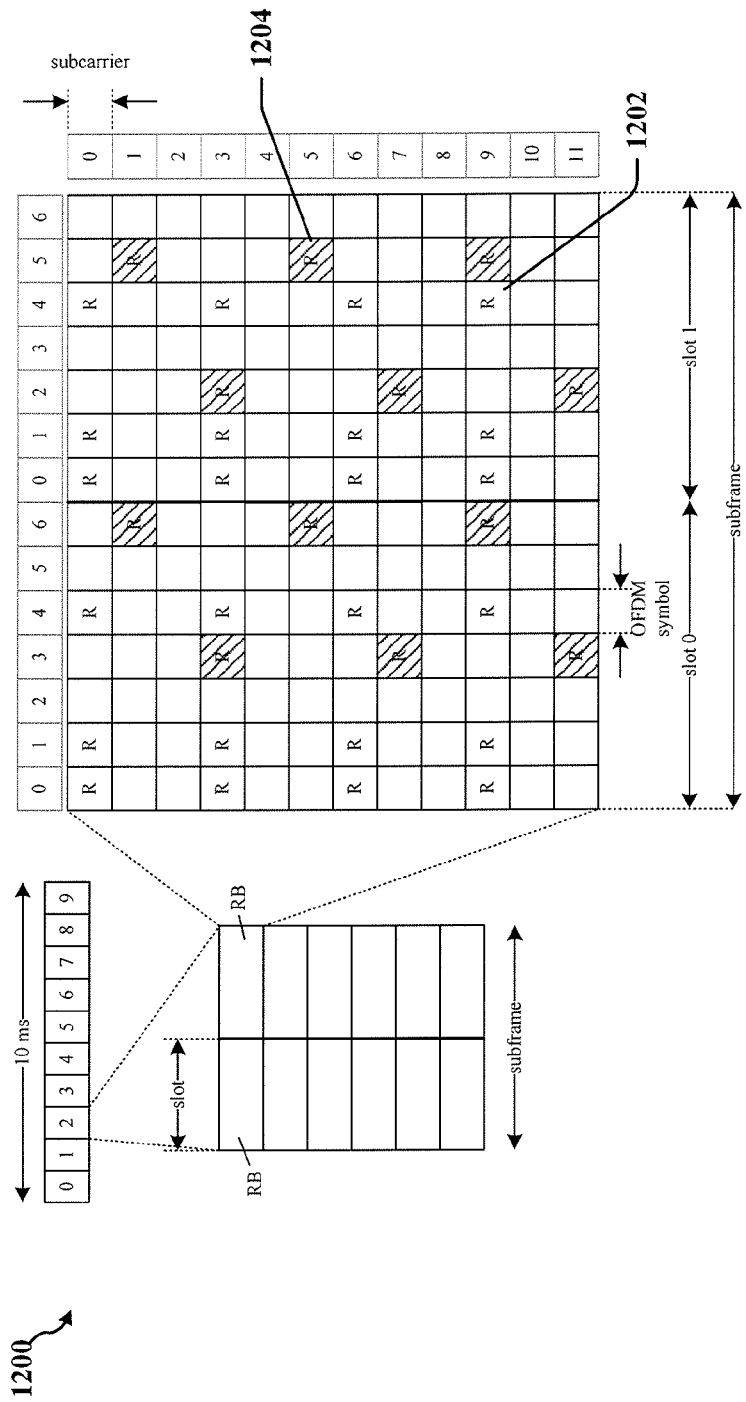
FIG. 12 is a diagram illustrating an example of a downlink (DL) frame structure in long term evolution (LTE).

FIG. 12 is a diagram 1200 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 1202, 1204, include DL reference signals (DL-RS). The DL-RS include Cell-specific RS (CRS) (also sometimes called common RS) 1202 and UE-specific RS (UE-RS) (also known as demodulation reference signals (DM-RS)) 1204. UE-RS 1204 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 13:
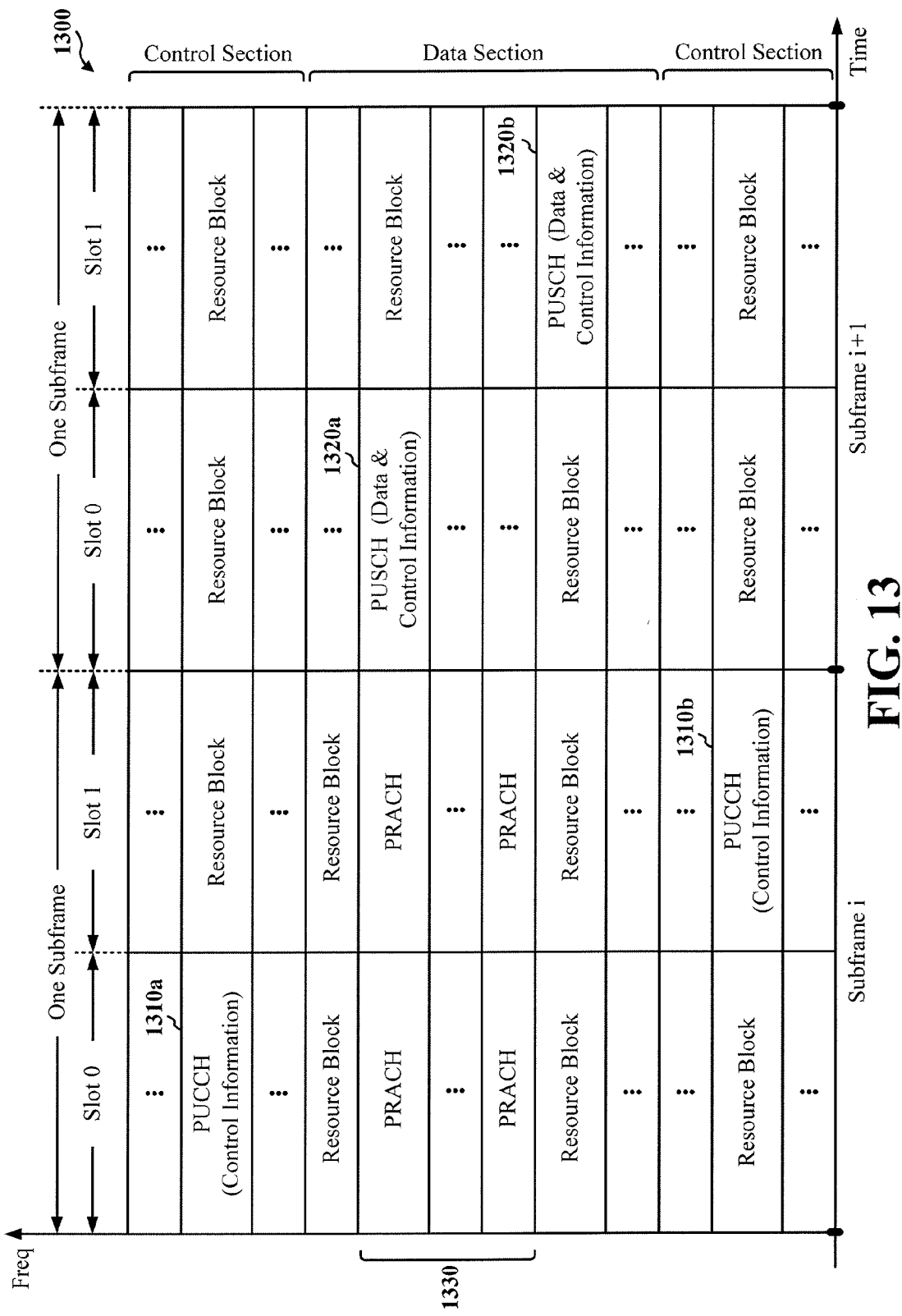
FIG. 13 is a diagram illustrating an example of an uplink (UL) frame structure in LTE.

FIG. 13 is a diagram 1300 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 1310a, 1310b in the control section to transmit control information to an eNB. The UE may also be assigned resource blocks 1320a, 1320b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a sub-frame and may hop across frequency.

A set of resource blocks may be used to perform initial system access and achieve UL synchronization in a physical random access channel (PRACH) 1330. The PRACH 1330 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 14:
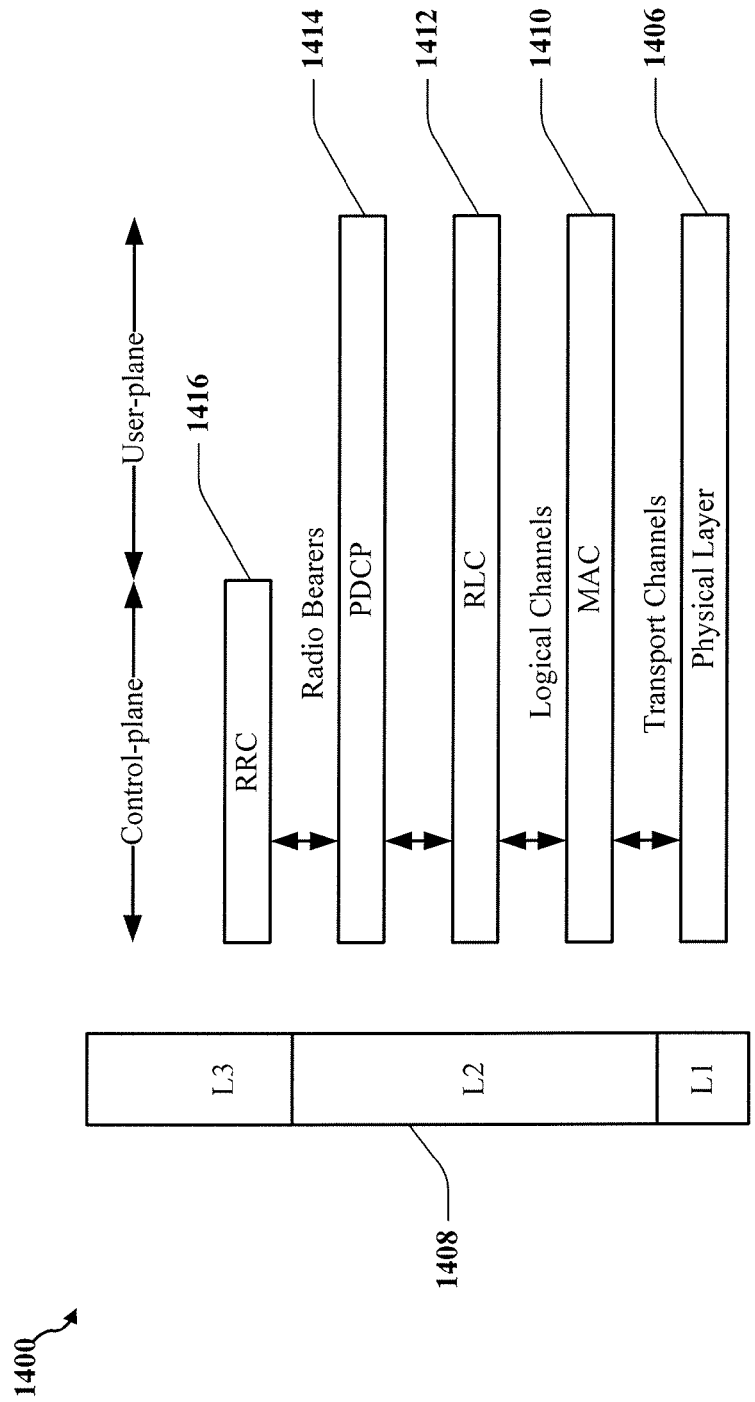
FIG. 14 is a diagram illustrating an example of a radio protocol architecture for the user and control planes.

FIG. 14 is a diagram 1400 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 1406. Layer 2 (L2 layer) 1408 is above the physical layer 1406 and is responsible for the link between the UE and eNB over the physical layer 1406.

In the user plane, the L2 layer 1408 includes a media access control (MAC) sublayer 1410, a radio link control (RLC) sublayer 1412, and a packet data convergence protocol (PDCP) 1414 sublayer, which are terminated at the eNB on the network side. Although not shown, the UE may have several upper layers above the L2 layer 1408 including a network layer (e.g., IP layer) that is terminated at the PDN gateway 1018 on the network side, and an application layer that is terminated at the other end of the connection (e.g., far end UE, server, etc.).

The PDCP sublayer 1414 provides multiplexing between different radio bearers and logical channels. The PDCP sublayer 1414 also provides header compression for upper layer data packets to reduce radio transmission overhead, security by ciphering the data packets, and handover support for UEs between eNBs. The RLC sublayer 1412 provides segmentation and reassembly of upper layer data packets, retransmission of lost data packets, and reordering of data packets to compensate for out-of-order reception due to hybrid automatic repeat request (HARQ). The MAC sublayer 1410 provides multiplexing between logical and transport channels. The MAC sublayer 1410 is also responsible for allocating the various radio resources (e.g., resource blocks) in one cell among the UEs. The MAC sublayer 1410 is also responsible for HARQ operations.

In the control plane, the radio protocol architecture for the UE and eNB is substantially the same for the physical layer 1406 and the L2 layer 1408 with the exception that there is no header compression function for the control plane. The control plane also includes a radio resource control (RRC) sublayer 1416 in Layer 3 (L3 layer). The RRC sublayer 1416 is responsible for obtaining radio resources (e.g., radio bearers) and for configuring the lower layers using RRC signaling between the eNB and the UE.

Figure 15:
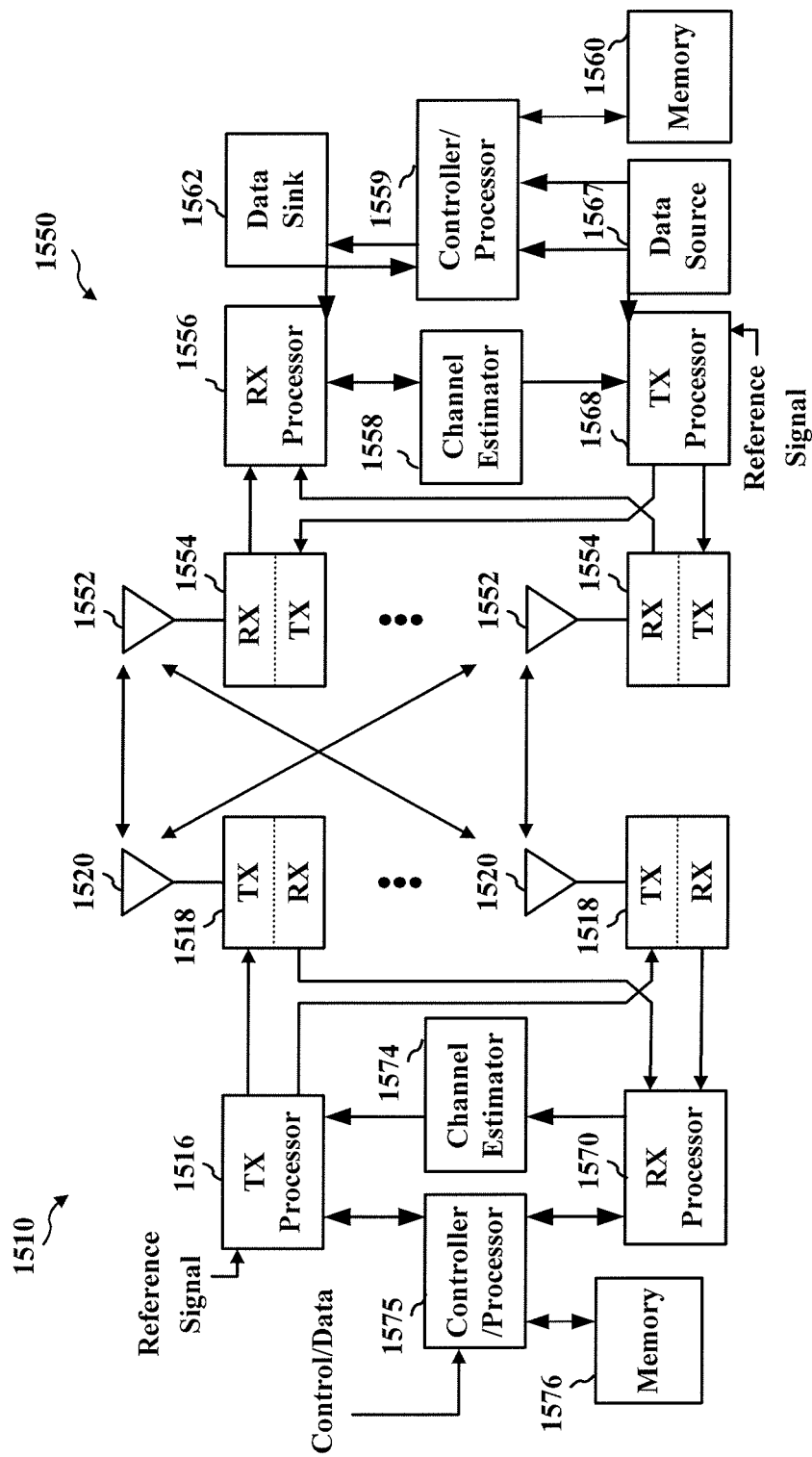
FIG. 15 is a diagram illustrating an example of an evolved Node B and UE in an access network.

FIG. 15 is a block diagram of an eNB 1510 in communication with a UE 1550 in an access network. In the DL, upper layer packets from the core network are provided to a controller/processor 1575. The controller/processor 1575 implements the functionality of the L2 layer. In the DL, the controller/processor 1575 provides header compression, ciphering, packet segmentation and reordering, multiplexing between logical and transport channels, and radio resource allocations to the UE 1550 based on various priority metrics. The controller/processor 1575 is also responsible for HARQ operations, retransmission of lost packets, and signaling to the UE 1550.

The transmit (TX) processor 1516 implements various signal processing functions for the L1 layer (e.g., physical layer). The signal processing functions includes coding and interleaving to facilitate forward error correction (FEC) at the UE 1550 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 1574 may be used to determine the coding and modulation scheme, as well as for spatial processing. The channel estimate may be derived from a reference signal and/or channel condition feedback transmitted by the UE 1550. Each spatial stream is then provided to a different antenna 1520 via a separate transmitter 1518TX. Each transmitter 1518TX modulates an RF carrier with a respective spatial stream for transmission.

At the UE 1550, each receiver 1554RX receives a signal through its respective antenna 1552. Each receiver 1554RX recovers information modulated onto an RF carrier and provides the information to the receive (RX) processor 1556. The RX processor 1556 implements various signal processing functions of the L1 layer. The RX processor 1556 performs spatial processing on the information to recover any spatial streams destined for the UE 1550. If multiple spatial streams are destined for the UE 1550, they may be combined by the RX processor 1556 into a single OFDM symbol stream. The RX processor 1556 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 1510. These soft decisions may be based on channel estimates computed by the channel estimator 1558. The soft decisions are then decoded and deinterleaved to recover the data and control signals that were originally transmitted by the eNB 1510 on the physical channel. The data and control signals are then provided to the controller/processor 1559.

The controller/processor 1559 implements the L2 layer. The controller/processor can be associated with a memory 1560 that stores program codes and data. The memory 1560 may be referred to as a computer-readable medium. In the UL, the control/processor 1559 provides demultiplexing between transport and logical channels, packet reassembly, deciphering, header decompression, control signal processing to recover upper layer packets from the core network. The upper layer packets are then provided to a data sink 1562, which represents all the protocol layers above the L2 layer. Various control signals may also be provided to the data sink 1562 for L3 processing. The controller/processor 1559 is also responsible for error detection using an acknowledgement (ACK) and/or negative acknowledgement (NACK) protocol to support HARQ operations.

In the UL, a data source 1567 is used to provide upper layer packets to the controller/processor 1559. The data source 1567 represents all protocol layers above the L2 layer. Similar to the functionality described in connection with the DL transmission by the eNB 1510, the controller/processor 1559 implements the L2 layer for the user plane and the control plane by providing header compression, ciphering, packet segmentation and reordering, and multiplexing between logical and transport channels based on radio resource allocations by the eNB 1510. The controller/processor 1559 is also responsible for HARQ operations, retransmission of lost packets, and signaling to the eNB 1510.

Channel estimates derived by a channel estimator 1558 from a reference signal or feedback transmitted by the eNB 1510 may be used by the TX processor 1568 to select the appropriate coding and modulation schemes, and to facilitate spatial processing. The spatial streams generated by the TX processor 1568 are provided to different antenna 1552 via separate transmitters 1554TX. Each transmitter 1554TX modulates an RF carrier with a respective spatial stream for transmission.

The UL transmission is processed at the eNB 1510 in a manner similar to that described in connection with the receiver function at the UE 1550. Each receiver 1518RX receives a signal through its respective antenna 1520. Each receiver 1518RX recovers information modulated onto an RF carrier and provides the information to a RX processor 1570. The RX processor 1570 may implement the L1 layer.

The controller/processor 1575 implements the L2 layer. The controller/processor 1575 can be associated with a memory 1576 that stores program codes and data. The memory 1576 may be referred to as a computer-readable medium. In the UL, the control/processor 1575 provides demultiplexing between transport and logical channels, packet reassembly, deciphering, header decompression, control signal processing to recover upper layer packets from the UE 1550. Upper layer packets from the controller/processor 1575 may be provided to the core network. The controller/processor 1575 is also responsible for error detection using an ACK and/or NACK protocol to support HARQ operations.

Incorporated is an Appendix A (attached), which describes example scenarios for power saving in communicating carrier information.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be teemed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for activating a transmitter to communicate in a wireless network, comprising:
   determining to activate a transmitter to serve a user equipment (UE) in a wireless network;
   broadcasting, by the transmitter, a portion of a set of broadcast signals in a radio frame without broadcasting a remaining portion of the set of broadcast signals in the radio frame, the portion comprises one or more cell-specific reference signals, primary synchronization signals, or secondary synchronization signals; and
   broadcasting, by the transmitter, the remaining portion of the set of broadcast signals along with the portion of the set of broadcast signals in a subsequent radio frame, the remaining portion comprises one or more system information signals including at least one of a system information block (SIB) or a primary broadcast channel (PBCH), the subsequent radio frame occurs after the radio frame and is deteimined by the transmitter based on one or more parameters specifying at least one timing for transmitting the remaining portion of the set of broadcast signals after the portion of the set of broadcast signals.

2. The method of claim 1, wherein the broadcasting the portion of the set of broadcast signals comprises transmitting at least one broadcast signal in the portion using a different transmit power over multiple subframes of the radio frame.

3. The method of claim 2, further comprising indicating a subset restriction for uplink control data to one or more UEs during the multiple subframes.

4. The method of claim 1, further comprising determining a primary cell identifier for transmitting the portion of the set of broadcast signals to avoid collision with a source node of the UE.

5. The method of claim 1, further comprising indicating one or more subframes for transmitting the portion of the set of broadcast signals as multimedia broadcast over single frequency network (MBSFN) subframes to avoid collision with a source node of the UE.

6. The method of claim 1, further comprising shifting subframes for transmission of the portion of the set of broadcast signals over a set of subframes to avoid collision with a source node of the UE.

7. The method of claim 1, wherein the broadcasting the portion of the set of broadcast signals comprises broadcasting the portion over a single antenna during the radio frame, and broadcasting the portion over an additional antenna in another radio frame.

8. The method of claim 1, wherein the broadcasting the portion of the set of broadcast signals comprises ramping up transmission power of at least one broadcast signal in the portion over a plurality of subframes.

9. The method of claim 8, wherein the ramping up is at a different rate than ramping up at least another broadcast signal in the portion of the set of broadcast signals.

10. The method of claim 8, further comprising signaling a power related to a cell specific reference signal (CRS), wherein the at least one broadcast signal is the CRS.

11. The method of claim 10, wherein the signaling the power comprises signaling the power in an updated system information block at each step of ramping up the CRS.

12. The method of claim 10, wherein the signaling the power comprises signaling at least one of an initial power of the ramping up, a projection of a received power of the CRS, an average power during ramping up the CRS, or a slope related to the ramping up the CRS.

13. The method of claim 10, further comprising adjusting a scaling ratio or factor related to signaling a power adjustment of a subsequent message related to the CRS.

14. The method of claim 1, wherein the broadcasting the portion of the set of broadcast signals comprises:
ramping up transmission power of the portion at a ramping rate, and
broadcasting the remaining portion comprises ramping up transmission power of at least a subset of the remaining portion at a different ramping rate.

15. The method of claim 1, wherein the broadcasting the remaining portion of the set of broadcast signals is based in part on receiving a handover message from a source node of the UE.

16. The method of claim 1, wherein the portion comprises at least one primary synchronization signal, at least one secondary synchronization signal, and at least one cell specific reference signal, and the remaining portion comprises at least one system infoiniation signal including the PBCH and at least another system information signal including the SIB.

17. The method of claim 1, further comprising receiving parameters related to broadcasting the portion and broadcasting the remaining portion in at least one of a local configuration, a configuration received from a network component, or a negotiation with a source node of the UE.

18. The method of claim 1, further comprising receiving parameters related to broadcasting the portion and broadcasting the remaining portion in a handover message from a source node of the UE.

19. An apparatus for activating a transmitter to communicate in a wireless network, comprising:
means for determining to activate a transmitter to serve a user equipment (UE) in a wireless network; and
means for broadcasting, by the transmitter, a portion of a set of broadcast signals in a radio frame without broadcasting a remaining portion of the set of broadcast signals in the radio frame, the portion comprises one or more cell-specific reference signals, primary synchronization signals, or secondary synchronization signals, and broadcasting, by the transmitter, the remaining portion of the set of broadcast signals along with the portion of the set of broadcast signals in a subsequent radio frame, the remaining portion comprises one or more system information signals including at least one of a system information block (SIB) or a primary broadcast channel (PBCH), the subsequent radio frame occurs after the radio frame and is determined by the transmitter based on one or more parameters specifying at least one timing for transmitting the remaining portion of the set of broadcast signals after the portion of the set of broadcast signals.

20. A non-transitory computer-readable medium comprising:
code for causing at least one computer to determine to activate a transmitter to serve a user equipment (UE) in a wireless network;
code for causing the at least one computer to broadcast, by the transmitter, a portion of a set of broadcast signals in a radio frame without broadcasting a remaining portion of the set of broadcast signals in the radio frame, the portion comprises one or more cell-specific reference signals, primary synchronization signals, or secondary synchronization signals; and
code for causing the at least one computer to broadcast, by the transmitter, the remaining portion of the set of broadcast signals along with the portion of the set of broadcast signals in a subsequent radio frame, the remaining portion comprises one or more system information signals including at least one of a system information block (SIB) or a primary broadcast channel (PBCH), the subsequent radio frame occurs after the radio frame and is deteimined by the transmitter based on one or more parameters specifying at least one timing for transmitting the remaining portion of the set of broadcast signals after the portion of the set of broadcast signals.

21. An apparatus for activating a transmitter to communicate in a wireless network, comprising:
a processor;
a memory in electronic communication with the processor;
instructions stored in the memory, the instructions being executable by the processor to:
determine to activate a transmitter to serve a user equipment (UE) in a wireless network;
broadcast, by the transmitter, a portion of a set of broadcast signals in a radio frame without broadcasting a remaining portion of the set of broadcast signals in the radio frame, the portion comprises one or more cell-specific reference signals, primary synchronization signals, or secondary synchronization signals; and broadcast, by the transmitter, the remaining portion of the set of broadcast signals along with the portion of the set of broadcast signals in a subsequent radio frame, the remaining portion comprises one or more system infoiiiiation signals including at least one of a system information block (SIB) or a primary broadcast channel (PBCH), the subsequent radio frame occurs after the radio frame and is deteiniined by the transmitter based on one or more parameters specifying at least one timing for transmitting the remaining portion of the set of broadcast signals after the portion of the set of broadcast signals.

22. An apparatus for activating a transmitter to communicate in a wireless network, comprising:
a processor;
a memory in electronic communication with the processor;
instructions stored in the memory, the instructions being executable by the processor to execute:
a discovery signal detecting module for deteimining to activate a transmitter to serve a user equipment (UE) in a wireless network; and
a signal broadcasting module for broadcasting, by the transmitter, a portion of a set of broadcast signals in a radio frame without broadcasting a remaining portion of the set of broadcast signals in the radio frame, the portion comprises one or more cell-specific reference signals, primary synchronization signals, or secondary synchronization signals, and broadcasting, by the transmitter, the remaining portion of the set of broadcast signals along with the portion of the set of broadcast signals in a subsequent radio frame, the remaining portion comprises one or more system infoiination signals including at least one of a system information block (SIB) or a primary broadcast channel (PBCH), the subsequent radio frame occurs after the radio frame and is determined by the transmitter based on one or more parameters specifying at least one timing for transmitting the remaining portion of the set of broadcast signals after the portion of the set of broadcast signals.

23. The apparatus of claim 22, wherein the signal broadcasting module transmits at least one broadcast signal in the portion using a different transmit power over multiple subframes of the radio frame.

24. The apparatus of claim 23, wherein the signal broadcasting module indicates a subset restriction for uplink control data to one or more UEs during the multiple subframes.

25. The apparatus of claim 22, wherein the signal broadcasting module determines a primary cell identifier for transmitting the portion of the set of broadcast signals to avoid collision with a source node of the UE.

26. The apparatus of claim 22, wherein the signal broadcasting module indicates one or more subframes for transmitting the portion of the set of broadcast signals as multimedia broadcast over single frequency network (MBSFN) subframes to avoid collision with a source node of the UE.

27. The apparatus of claim 22, wherein the signal broadcasting module shifts subframes for transmission of the portion of the set of broadcast signals over a set of subframes to avoid collision with a source node of the UE.

28. The apparatus of claim 22, wherein the signal broadcasting module broadcasts the portion of the set of broadcast signals over a single antenna during the radio frame, and broadcasts the portion over an additional antenna in another radio frame.

29. The apparatus of claim 22, wherein the signal broadcasting module ramps up transmission power of at least one broadcast signal in the portion over a plurality of subframes.

30. The apparatus of claim 29, wherein the signal broadcasting module ramps up at a different rate than ramping up at least another broadcast signal in the portion of the set of broadcast signals.

31. The apparatus of claim 29, wherein the signal broadcasting module signals a power related to a cell specific reference signal (CRS), wherein the at least one broadcast signal is the CRS.

32. The apparatus of claim 31, wherein the signal broadcasting module signals the power in an updated system infoimation block at each step of ramping up the CRS.

33. The apparatus of claim 31, wherein the signal broadcasting module signals at least one of an initial power of the ramping up, a projection of a received power of the CRS, an average power during ramping up the CRS, or a slope related to the ramping up the CRS.

34. The apparatus of claim 31, wherein the signal broadcasting module adjusts a scaling ratio or factor related to signaling a power adjustment of a subsequent message related to the CRS.

35. The apparatus of claim 22, wherein the signal broadcasting module ramps up transmission power of the portion at a ramping rate, and ramps up transmission power of at least a subset of the remaining portion at a different ramping rate.

36. The apparatus of claim 22, wherein the signal broadcasting module broadcasts the remaining portion of the set of broadcast signals based in part on receiving a handover message from a source node of the UE.

37. The apparatus of claim 22, wherein the portion comprises at least one primary synchronization signal, at least one secondary synchronization signal, and at least one cell specific reference signal, and the remaining portion comprises at least one system information signal including the PBCH and at least another system information signal including the SIB.

38. The apparatus of claim 22, the instructions being executable by the processor to further execute a configuration receiving module for receiving parameters related to broadcasting the portion, wherein the signal broadcasting module broadcasts the remaining portion in at least one of a local configuration, a configuration received from a network component, or a negotiation with a source node of the UE.

39. The apparatus of claim 22, the instructions being executable by the processor to further execute a configuration receiving module for receiving parameters related to broadcasting the portion, wherein the signal broadcasting module broadcasts the remaining portion in a handover message from a source node of the UE.

* * * * *

UNITED STATES PATENT AND TRADEMARK OFFICE
CERTIFICATE OF CORRECTION

PATENT NO. : 9,867,163 B2
APPLICATION NO. : 13/931346
DATED : January 9, 2018
INVENTOR(S) : Hao Xu et al.

It is certified that error appears in the above-identified patent and that said Letters Patent is hereby corrected as shown below:

In the Claims

Claim 1, Column 20, Line 66 reads:
radio frame and is deteimined by the transmitter based
Should read:
radio frame and is determined by the transmitter based Claim 16, Column 21, Line 65 reads:
prises at least one system infoiniation signal including the
Should read:
prises at least one system information signal including the Claim 20, Column 22, Line 52 reads:
radio frame and is deteimined by the transmitter based
Should read:
radio frame and is determined by the transmitter based Claim 21, Column 23, Line 10 reads:
system infoiiiiation signals including at least one of
Should read:
system information signals including at least one of Claim 21, Column 23, Line 13 reads:
frame occurs after the radio frame and is deteiniined
Should read:
frame occurs after the radio frame and is determined Signed and Sealed this
Seventeenth Day of April, 2018

Andrei Iancu
*Director of the United States Patent and Trademark Office*

CERTIFICATE OF CORRECTION (continued)
U.S. Pat. No. 9,867,163 B2

Claim 22, Column 23, Line 25 reads:
a discovery signal detecting module for deteimining to
Should read:
a discovery signal detecting module for determining to Claim 22, Column 23, Line 39 reads:
more system infoiination signals including at least
Should read:
more system information signals including at least Claim 32, Column 24, Line 24 reads:
infoimation block at each step of ramping up the CRS.
Should read:
information block at each step of ramping up the CRS.